United States Patent
Kuno

(10) Patent No.: US 7,929,188 B2
(45) Date of Patent: Apr. 19, 2011

(54) COLOR GAMUT DATA CREATING DEVICE

(75) Inventor: Masashi Kuno, Obu (JP)

(73) Assignee: Brother Kogyo Kabushiki Kaisha, Aichi-Ken (JP)

( * ) Notice: Subject to any disclaimer, the term of this patent is extended or adjusted under 35 U.S.C. 154(b) by 221 days.

(21) Appl. No.: 12/163,399

(22) Filed: Jun. 27, 2008

(65) Prior Publication Data

US 2009/0002737 A1 Jan. 1, 2009

(30) Foreign Application Priority Data

Jun. 28, 2007 (JP) ................................. 2007-171126
Jun. 29, 2007 (JP) ................................. 2007-172940

(51) Int. Cl.
*G03F 3/08* (2006.01)
*G06F 15/00* (2006.01)
*G06K 9/00* (2006.01)

(52) U.S. Cl. .......................... 358/523; 358/1.9; 382/167

(58) Field of Classification Search ................... 358/1.9, 358/523, 530, 520, 518; 382/167, 162
See application file for complete search history.

(56) References Cited

U.S. PATENT DOCUMENTS

| | | | |
|---|---|---|---|
| 5,699,491 A | 12/1997 | Barzel | |
| 5,721,572 A * | 2/1998 | Wan et al. | 345/590 |
| 7,379,204 B2 | 5/2008 | Fukao | |
| 2006/0170999 A1 * | 8/2006 | Sloan et al. | 358/520 |
| 2007/0041026 A1 * | 2/2007 | Tin | 358/1.9 |
| 2007/0091337 A1 | 4/2007 | Morovic | |
| 2007/0097389 A1 * | 5/2007 | Morovic | 358/1.9 |
| 2007/0279714 A1 * | 12/2007 | Higashikata et al. | 358/518 |
| 2009/0310154 A1 * | 12/2009 | Morovic et al. | 358/1.9 |

FOREIGN PATENT DOCUMENTS

| | | |
|---|---|---|
| JP | 03-35376 | 2/1991 |
| JP | 10-172006 | 6/1998 |
| JP | 2002-64721 | 2/2002 |
| JP | 2002-223366 | 8/2002 |
| JP | 2004-32749 | 1/2004 |
| JP | 2006-180062 | 7/2006 |
| JP | 2006-180063 | 7/2006 |
| JP | 2006-203526 | 8/2006 |
| JP | 2006-345187 | 12/2006 |
| JP | 2007-096430 | 4/2007 |
| JP | 2007-124648 | 5/2007 |

* cited by examiner

*Primary Examiner* — Madeleine A Nguyen
(74) *Attorney, Agent, or Firm* — Scully, Scott, Murphy & Presser, P.C.

(57) ABSTRACT

A color gamut data creating device includes a locating unit, and an extracting unit. The locating unit locates characteristic points based on the measurement points on a target plane. The extracting unit extracts at least three vertices of a color gamut from among the characteristic points. The at least three vertices satisfy the conditions that a first point, which is any one of the at least three vertices, is located within a reference distance from a second point adjacent to the first point from among the at least three vertices, and that all cross products that are calculated by a vector from the first point to the second point and vectors from the first point to any characteristic points that are located within the reference distance from the first point have the same sign.

3 Claims, 27 Drawing Sheets

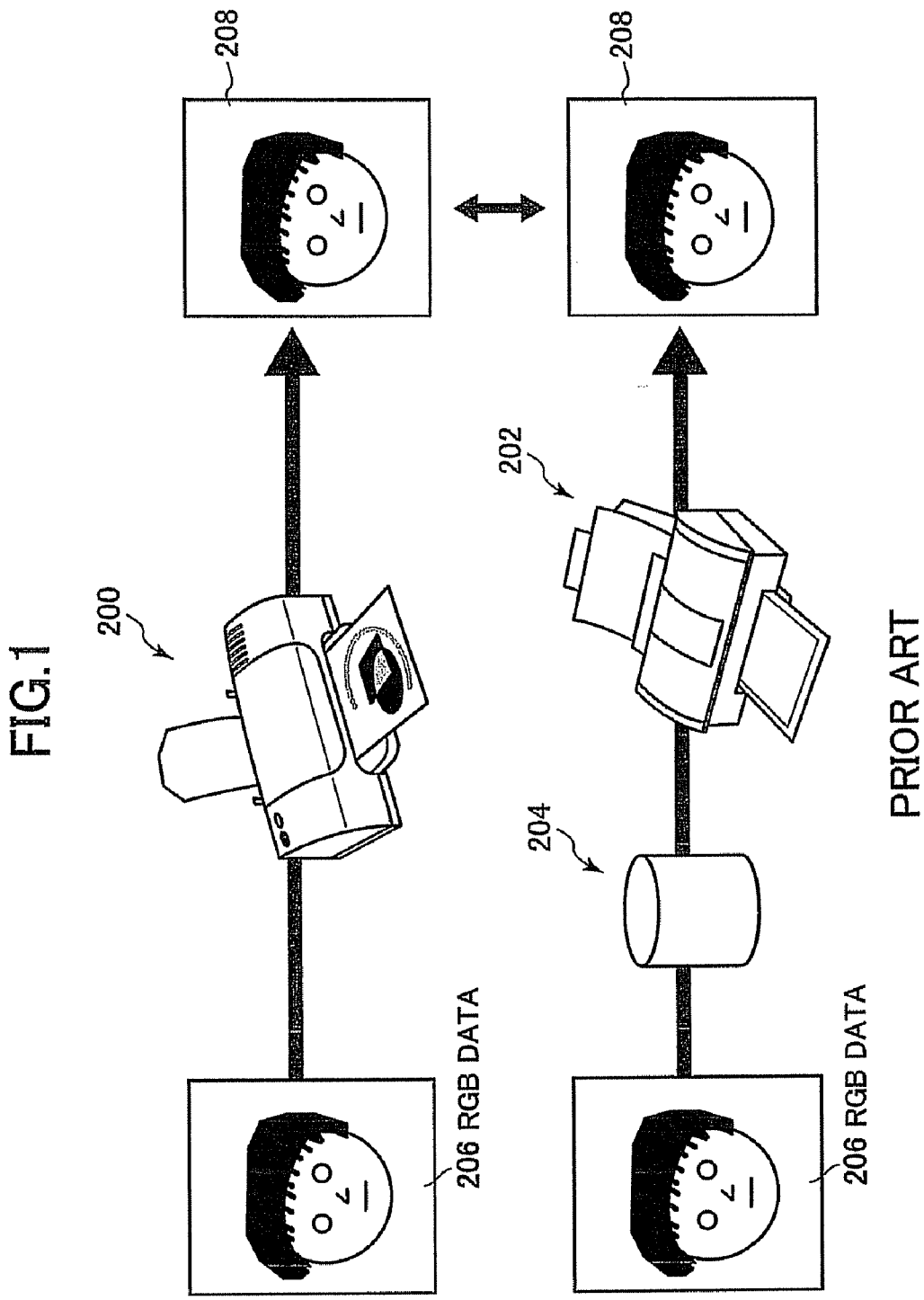

PRIOR ART

PRIOR ART

PRIOR ART

PRIOR ART

PRIOR ART

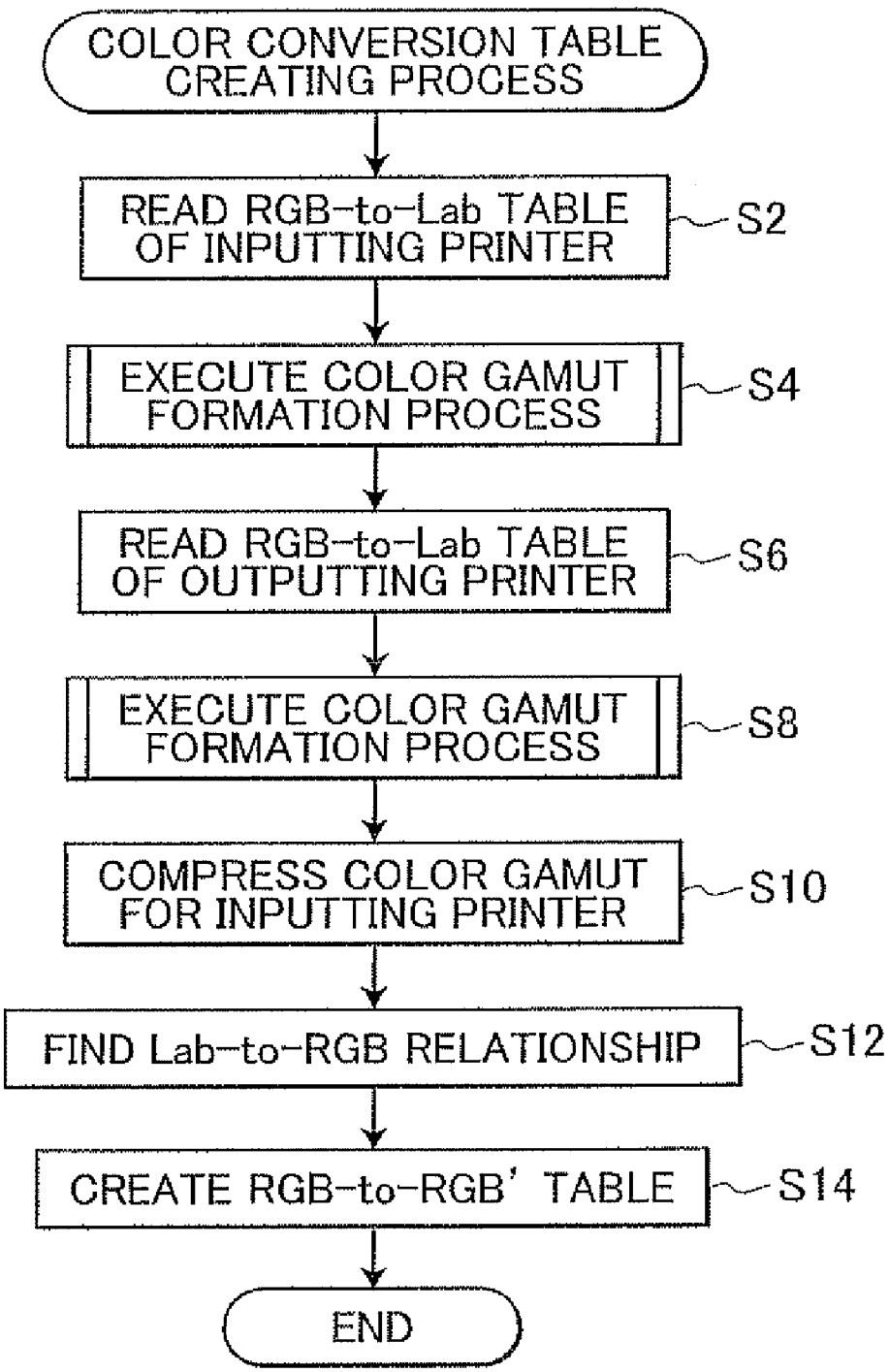

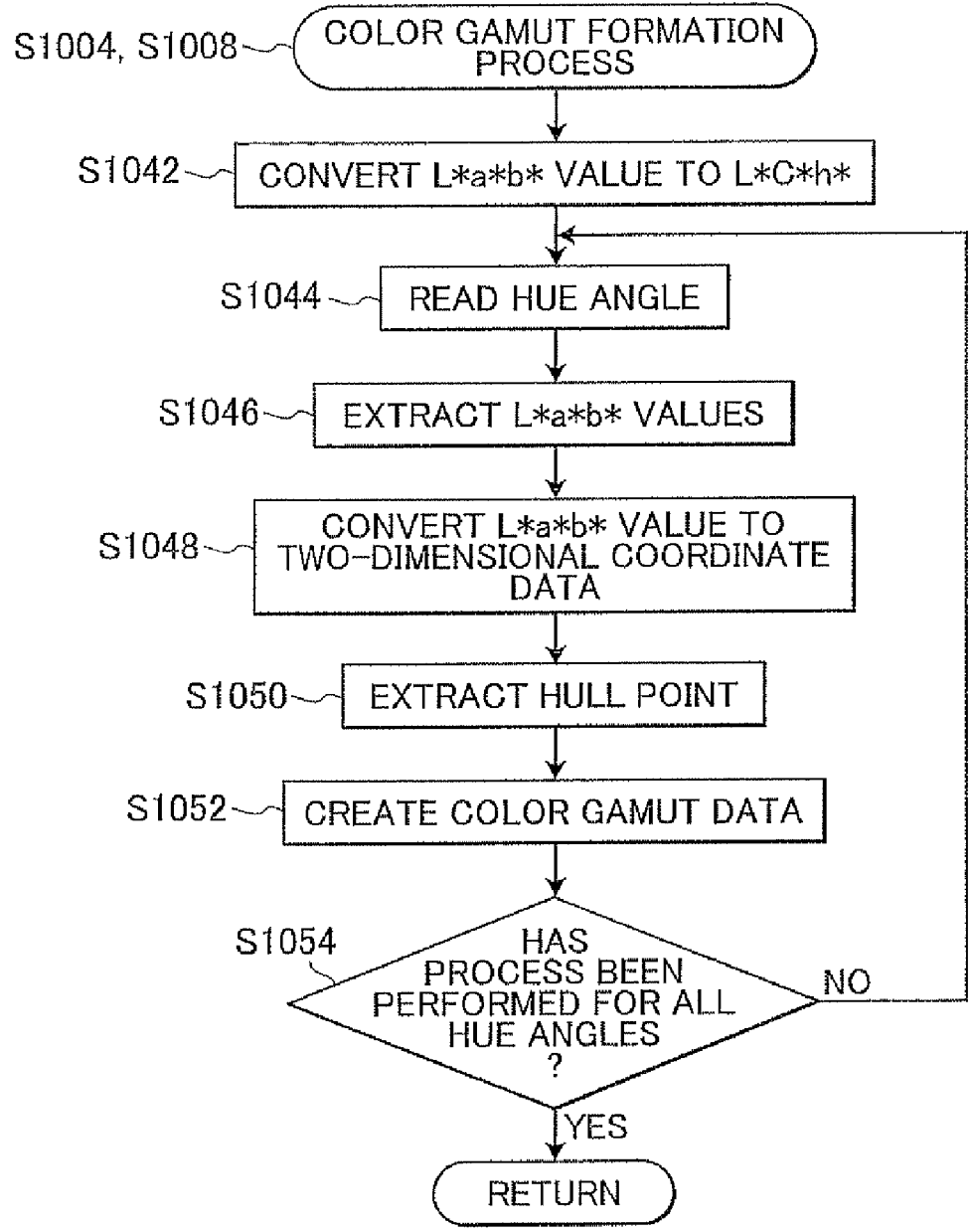

COLOR GAMUT DATA CREATING DEVICE

CROSS REFERENCE TO RELATED APPLICATION

This application claims priorities from Japanese Patent Application No. 2007-171126 filed Jun. 28, 2007 and Japanese Patent Application No. 2007-172940 filed Jun. 29, 2007. The entire contents of these priority applications are incorporated herein by reference.

TECHNICAL FIELD

The present invention relates to a color gamut data creating device and a color gamut data creating method capable of creating color gamut data.

BACKGROUND

There have been known systems including an input device for inputting an image and an output device for outputting the image. Japanese Patent Application Publication No. 2006-180062 discloses a system implementing a color matching process (gamut compression) to correct differences in appearance between the input image and the output image caused by discrepancies between the color-reproducible ranges (gamuts) of the input device and output device.

SUMMARY

Here, a conventional color matching process will be described with reference to FIG. 1, which conceptually illustrates the color matching system. The color matching system shown in FIG. 1 includes an inputting printer 200 serving as the input device, an outputting printer 202 serving as the output device, and a color matching device 204. When an external device, such as a personal computer, inputs RGB data 206 into the inputting printer 200 and outputting printer 202, the printers 200 and 202 each form an image on recording paper 208 based on the RGB data 206.

If the range of colors (gamut) that can be reproduced by the outputting printer 202 is more restricted than the reproducible range of the inputting printer 200 for any reason, such as the inputting printer 200 being a superior model to the outputting printer 202, then there exist colors that can be produced with the inputting printer 200 but not with the outputting printer 202. As a result, even if the same RGB data 206 is inputted into both printers 200 and 202, the overall appearance of the images formed on the recording papers 208 by the printers will differ.

The color matching device 204 is provided to acquire and compare the gamuts of the printers 200 and 202 and correct any colors that can be outputted on the inputting printer 200 but not on the outputting printer 202 so that the overall appearances of the images outputted by both printers more closely resemble each other.

In other words, the color matching device 204 performs a process for acquiring the color gamut of the inputting printer 200 and the color gamut of the outputting printer 202, for comparing these color gamuts in order to create a calibration table for calibrating the differences in the gamuts, and for subsequently calibrating output data for the outputting printer 202 based on the calibration table to produce a similar overall appearance of images formed on the two printers.

Here, the above process will be described with reference to FIGS. 2(a) and 2(b) up to the point that the color matching device 204 acquires gamuts of the printers. FIG. 2(a) conceptually illustrates the conventional inputting printer 200, the RGB data 206 for a test pattern inputted into the inputting printer 200, and the recording paper 208 on which the inputting printer 200 forms color patches based on the inputted RGB data 206. A colorimeter can then be used to measure colors in the color patches formed on the recording paper 208.

FIG. 2(b) shows color values obtained by measuring the color patches that have been plotted in the L*a*b* color space. Points plotted in this color space based on the measured color values will be referred to as measurement points. The color gamut of the inputting printer 200 can be identified from the distributed range of measurement points in the color space. One method of rendering this type of color gamut that is well known in the art is a method using a convex hull.

The convex hull is determined by a well known flexible sequential LGB method. FIGS. 3(a)-3(b) illustrate this flexible sequential LGB method for representing a color gamut with a convex hull.

FIG. 3(a) illustrates, on its left side, an L*a*b* color space 210. In the L*a*b* color space 210, an achromatic axis (L* axis) 212 represents the lightness of color, a positive a* axis is set to 0°, and a hue angle φ counterclockwise from the positive a* axis represents hue.

While the measurement points plotted in the color space are distributed three-dimensionally as shown in the example of FIG. 2(b) in this method of rendering a color gamut, the three-dimensionally distributed measurement points are reduced to two dimensions by projecting the measurement points onto a plane (hue section) 214 for each hue as shown in the right side of FIG. 3(a).

The flexible sequential LGB method defines a hue section 214 as a cross section in the L*a*b* space 210 at each hue, projects, on the hue section 214, measurement points that are located near the hue section 214, and calculates the color gamut based on the projected measurement points for the subject hue.

FIG. 3(b) illustrates how to determine a color gamut based on the distribution of measurement points projected onto the hue section 214.

The distributed range of these measurement points corresponds to a color gamut 216 in the hue section 214. In the flexible sequential LGB method, the hue section 214 is set at regular intervals of hue angle from 0° to 360° and finds the color gamut 216 for each hue section 214 to express the color gamut of the device.

As shown in FIG. 3(b), a convex hull 216 having a convex shape and capable of enveloping all measurement points projected onto the two-dimensional plane 214 is found. The vertices for forming this convex hull 216 can be found using an algorithm well known in the art, such as the gift wrapping algorithm. Once the vertices are determined, the scope of the convex hull 216 corresponding to the color gamut can be represented numerically using coordinates of these vertices. The color gamut for the outputting printer 202 can be expressed numerically using the same technique.

The above described conventional method uses a concept of the convex hull to represent the color gamut. In FIG. 3(c), the convex hull 216 is rendered with a solid line. As shown in FIG. 3(c), when the distance between points X and Y is considerably long and there exists a point Z near a midpoint of the line XY, the line XY does not form the actual color gamut. In actuality, the color gamut should be defined by lines XZ and ZY. Using the conventional method of determining the color gamut with the convex hull 210, it is not possible to select such the point Z. It is impossible to determine the color gamut accurately.

FIGS. 4(a) and 4(b) illustrate problems that can occur when the color gamut is not rendered accurately. FIG. 4(a) shows the color gamut 222 for the inputting printer 200 formed as a convex hull encompassing the measurement points, and a color gamut 224 for the outputting printer 202 superimposed over the color gamut 222. FIG. 4(b) is an enlarged view showing a portion of FIG. 4(a). As shown in FIG. 4(a), the color gamut 222 for the inputting printer 200 is broader than the color gamut 224 for the outputting printer 202.

In this example, the conventional color matching device 204 matches a color within the color gamut 222 of the inputting printer 200 and outside of the color gamut 224 for the outputting printer 202, such as the point T, to a color within the color gamut 224 of the outputting printer 202.

However, although the point T falls on the boundary of the color gamut 222, there exist no measurement points in the vicinity of the point T. Therefore, it is estimated that the inputting printer 200 cannot actually produce this color in a region around the point T.

The color matching device 204 assigns one of the colors of the outputting printer 202 within the color gamut 224 to colors of the inputting printer 200 which are within the color gamut 224 but which are not actually produced by the inputting printer 200. For example, the color matching device 204 assigns a color of the outputting printer 202 at the point U to a color of the inputting printer 200 at the point T. Further, the color matching device 204 assigns a color of the outputting printer 202 at a point having slightly less saturation than that of the point U to the color of the outputting printer 200 at a point having slightly less saturation than that of the point T, in order to produce a smooth gamut boundary.

As a result of this conversion, the color at the point U is not used on the outputting printer 202 when the printers 200 and 202 are used in combination and, hence, the color gamut of the outputting printer 202 is not sufficiently utilized.

FIG. 5 shows an a*b* plane viewed from above the L*a*b* color space 210. When creating a hue section HA at the hue angle $\theta_A$ in the above technique, for example, measurement points belonging to hues within the range $\theta_A \pm \alpha$ are all projected on the hue section HA. The color gamut in this hue section HA is equivalent to the color gamut for the hue angle $\theta_A \pm \alpha$.

However, since the above technique includes a is step for projecting measurement points, it is difficult to express the color gamut accurately when there exist measurement points with extremely high or law saturation.

This problem of the above technique will be described with reference to FIG. 5. FIG. 5 shows a distributed range 218 of the measurement points when all measurement points within the L*a*b* color space 210 are projected onto the a*b* plane. Since distance from a point of origin in the a*b* plane denotes color saturation, the distributed range 218 in FIG. 5 expresses color with the maximum color saturation possible for each hue.

Here, examples of a hue section HB and a hue section HC will be considered. In this case, measurement points positioned within the $\pm\alpha$ range of the hue angle of the hue section HB are projected onto the hue section HB. Similarly, measurement points positioned within the $\pm\alpha$ range of the hue angle of the hue section HC are projected onto the hue section HC. If the measurement point at a point (vertex) D is positioned within the $\pm\alpha$ range of the hue angle of the hue section HB, this measurement point at the point D is projected on the hue section HB. If the measurement point at a point D is positioned within the $\pm\alpha$ range of the hue angle of the hue section HC, this measurement point at the point D is projected on the hue section HC.

However, since the point D has a high saturation that protrudes farther than the maximum saturation values in the hue sections HB and HC, projecting the point D on the hue section HB or HC changes the maximum value of saturation for this section, making it impossible to find an accurate color gamut for the hue section HE or HC.

While it is possible to suppress this problem to a degree by providing hue sections densely, increasing the number of hue sections leads to a longer processing time for calculating the color gamut of each hue and requires a large memory capacity for storing this color gamut data.

In view of the foregoing, it is an object of the present invention to provide a color gamut data creating device and a color gamut data creating method capable of creating color gamut data that can faithfully reproduce the color gamut.

It is another object of the invention to provide a color gamut data creating device and a color gamut data creating method capable of creating color gamut data that accurately expresses the color gamut of a device, without increasing the number of hue sections.

In order to attain the above and other objects, the invention provides a color gamut data creating device. The color gamut data creating device includes a receiving unit, a locating unit, an extracting unit, and a data creating unit. The receiving unit receives measurement points concerning a device. The measurement points is defined in a color space that is capable of representing hue by a hue angle. The hue angle is defined by an axis perpendicular to an achromatic axis that represents lightness. The locating unit locates characteristic points based on the measurement points on a target plane that has a constant angle of the hue angle. The extracting unit extracts at least three vertices of a color gamut from among the characteristic points. The at least three vertices satisfy conditions that a first point, which is any one of the at least three vertices, is located within a reference distance from a second point adjacent to the first point from among the at least three vertices, and that all cross products that are calculated by a vector from the first point to the second point and vectors from the first point to any characteristic points that are located within the reference distance from the first point have the same sign. The data creating unit creates color gamut data indicative of the color gamut. The color gamut indicates a distribution range of the characteristic points based on the at least three vertices extracted by the extracting unit.

According to another aspects, the invention provides a color gamut data creating device. The color gamut data creating device includes a receiving unit, an extracting unit, and a data creating unit. The receiving unit receives measurement points of a device, the measurement points being defined in a color space. The extracting unit extracts at least four vertices from among the measurement points. The at least four vertices includes first, second, and third vertices that are located adjacent to one another. The distance between each two points among the first, second, and third vertices is smaller than a reference distance. Inner products of vectors defined from the first vertex to all the measurement points located within the reference distance from the first vertex and a vector normal to a plane defined by the first, second, and third vertices have the same sign. The data creating unit creates color gamut data indicative of a color gamut. The color gamut indicates a distribution range of the measurement points based on the at least four vertices extracted by the extracting unit.

According to still another aspects, the invention provides a color gamut data creating device. The color gamut data creating device includes a receiving unit, a projecting unit, a first vertex extracting unit, a vertex angle determining unit, a locating unit, and a data creating unit. The receiving unit receives measurement points concerning a device. The measurement points is defined in a color space that is capable of representing hue by a hue angle. The hue angle is defined by an axis perpendicular to an achromatic axis that represents lightness. The projecting unit projects the measurement points on a projecting plane that is perpendicular to the achromatic axis. The first vertex determining unit determines a vertex of a polygon that is formed based on the measurement points projected onto the projecting plane. The vertex angle determining unit determines a hue angle of the vertex. The target-plane angle determining unit determines a hue angle of a target plane based on the hue angle of the vertex determined by the vertex determining unit. The locating unit locates characteristic points based on the measurement points on the target plane. The data creating unit creates color gamut data indicative of a color gamut. The color gamut indicates a distribution range of the characteristic points based on the characteristic points on the target plane. The color gamut data includes data indicative of positions of at least three characteristic points in the characteristic points.

According to still another aspects, the invention provides a color gamut data creating method. The color gamut data creating method includes receiving measurement points concerning a device, wherein the measurement points is defined in a color space that is capable of representing hue by a hue angle, wherein the hue angle is defined by an axis perpendicular to an achromatic axis that represents lightness, locating characteristic points based on the measurement points on a target plane that has a constant angle of the hue angle, extracting at least three vertices of a color gamut from among the characteristic points, wherein the at least three vertices satisfy conditions that a first point, which is any one of the at least three vertices, is located within a reference distance from a second point adjacent to the first point from among the at least three vertices, and that all cross products that are calculated by a vector from the first point to the second point and vectors from the first point to any characteristic points that are located within the reference distance from the first point have the same sign, and creating color gamut data indicative of the color gamut, wherein the color gamut indicates a distribution range of the characteristic points based on the at least three vertices extracted by the extracting.

According to still another aspects, the invention provides a computer-readable storage medium storing a set of program instructions executable on a color gamut creating device. The program instructions include receiving measurement points concerning a device wherein the measurement points is defined in a color space that is capable of representing hue by a hue angle, wherein the hue angle is defined by an axis perpendicular to an achromatic axis that represents lightness, locating characteristic points based on the measurement points on a target plane that has a constant angle of the hue angler extracting at least three vertices of a color gamut from among the characteristic points wherein the at least three vertices satisfy the conditions that a first point, which is any one of the at least three vertices, is located within a reference distance from a second point adjacent to the first point from among the at least three vertices, and that all cross products that are calculated by a vector from the first point to the second point and vectors from the first point to any characteristic points that are located within the reference distance from the first point have the same sign, and creating color gamut data indicative of the color gamut, the color gamut indicating a distribution range of the characteristic points based on the at least three vertices extracted by the extracting.

According to still another aspects, the invention provides a color gamut data creating method. The color gamut data creating method includes receiving measurement points concerning a device wherein the measurement points is defined in a color space that is capable of representing hue by a hue angle, wherein the hue angle is defined by an axis perpendicular to an achromatic axis that represents lightness, projecting the measurement points on a projecting plane that is perpendicular to the achromatic axis, extracting a vertex of a polygon that is formed based on the measurement points projected onto the projecting plane, determining a hue angle of the vertex, determining a hue angle of a target plane based on the determined hue angle of the vertex, locating characteristic points based on the measurement points on the target plane, and creating color gamut data indicative of a color gamut wherein the color gamut indicates a distribution range of the characteristic points based an the characteristic points on the target plane.

According to still another aspects, the invention provides a computer-readable storage medium storing a set of program instructions executable on a color gamut creating device. The program instructions include receiving measurement points concerning a device wherein the measurement points is defined in a color space that is capable of representing hue by a hue angle, wherein the hue angle is defined by an axis perpendicular to an achromatic axis that represents lightness, projecting the measurement points on a projecting plane that is perpendicular to the achromatic axis, extracting a vertex of a polygon that is formed based on the measurement points projected onto the projecting plane, determining a hue angle of the vertex, determining a hue angle of a target plane based on the determined hue angle, locating characteristic points based on the measurement points on the target plane, and creating color gamut data indicative of a color gamut wherein the color gamut indicates a distribution range of the characteristic points based on the characteristic points on the target plane.

BRIEF DESCRIPTION OF THE DRAWINGS

Embodiments in accordance with the invention will be described in detail with reference to the following figures wherein:

FIG. 1 conceptually illustrates a conventional color matching system;

FIGS. 3(a)-3(c) illustrate a conventional method of representing a color gamut for a hue cross section in the L*a*b* color space with the convex hull, wherein FIG. 3(a) illustrates the conventional method of projecting measurement points on a hue cross section in the L*a*b* color space, FIG. 3(b) illustrates the conventional method of representing the color gamut with the convex hull, and FIG. 3(c) illustrates a problem that occurs with the conventional method;

FIG. 9 is a flowchart illustrating steps in a color conversion table creating process;

FIG. 22 is a flowchart illustrating steps in a color gamut formation process in the process of FIG. 19;

DETAILED DESCRIPTION

First Embodiment

Figure 6:
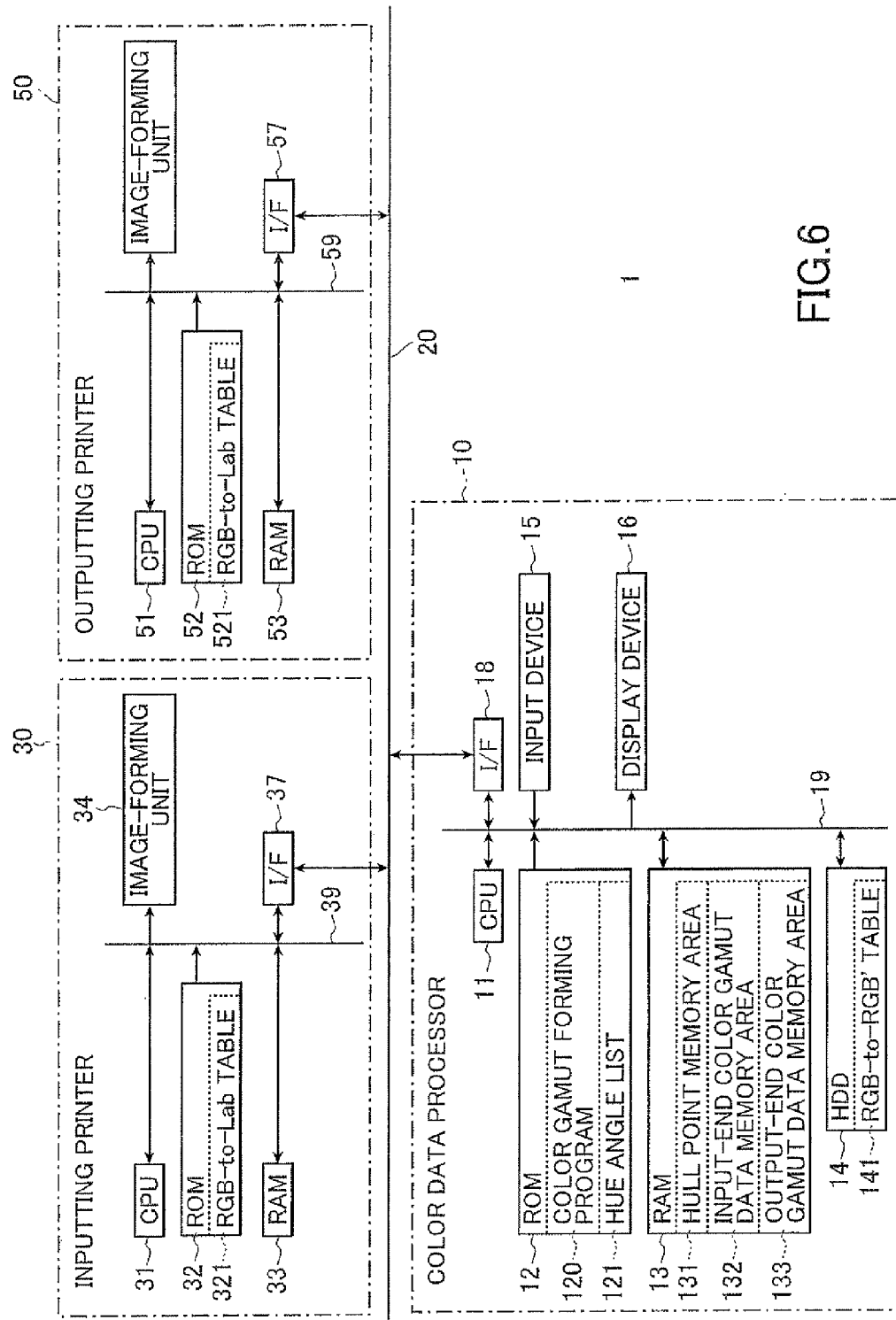
FIG. 6 is a block diagram showing an overall structure of a color data processing system provided with a color data processor according to a first embodiment.

Next, a first embodiment of the invention will be described while referring to the accompanying drawings. FIG. 6 is a block diagram showing the overall structure of a color data processing system 1 provided with a color data processor 10, which is the embodiment of the color gamut data creating device according to the invention. The color data processing system as shown in FIG. 6 includes the color data processor 10, and an inputting printer 30 and an outputting printer 50 connected to the color data processor 10. The color data processor 10 performs a color data conversion process to make the overall appearance of images formed on the inputting printer 30 similar to the overall appearance of images formed on the outputting printer 50.

As shown in FIG. 6, the color data processor 10 includes a CPU 11, a ROM 12, a Rim 13, a hard disk drive (HDD) 14, an input device 15, a display device 16, and a network interface 18.

The CPU 11 is a central processing unit performing overall control of the color data processor 10. The CPU 11 executes a program to implement the process shown in the flowcharts of FIGS. 9, 10, and 12.

The ROM 12 is a non-rewritable memory storing various control programs executed by the CPU 11 and data required by the CPU 11 to execute these control programs. The ROM 12 stores the program used to implement the process shown in the flowcharts of FIGS. 9, 10, and 12. Particularly, the ROM 12 stores a color gamut forming program 120 used to implement a process described in the flowcharts of FIGS. 10 and 12.

The ROM 12 also stores a hue angle list 121 describing a plurality of hue angles.

Figure 7A:
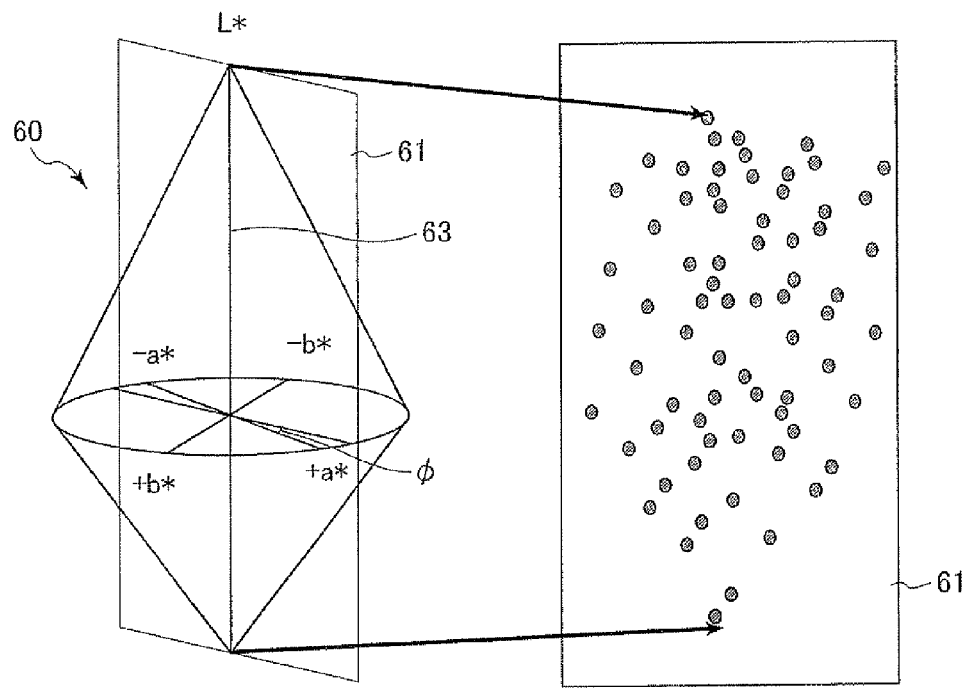
FIG. 7(a) is an explanatory diagram illustrating how to project measurement points on a hue cross section in a L*a*b* color space three-dimensionally.

Here, the hue angle will be described with reference to FIG. 7(a). A left side of FIG. 7(a) is an explanatory diagram illustrating an L*a*b* color space 60 three-dimensionally and a hue cross section 61. The L*a*b* color space 60 is expressed by a three dimensional Cartesian coordinate system having an L* axis, an a* axis perpendicular to the L* axis, and a b* axis perpendicular both the L* axis and as axis. As shown in the left side of FIG. 7(a), a hue angle φ representing the value of hue is an angle of movement in a counterclockwise direction from the positive a* axis set to 0°. A right side of FIG. 7(a) shows how measurement points are projected on the hue cross section 61 shown in the left side of FIG. 7(a).

The hue angle list 121 describes hue angles from 0° to 180° by 9° increments, for example. The color data processor 10 according to the embodiment creates color gamut data for a hue cross section 61 at each hue angle. This process will be described in detail later.

Returning to FIG. 6, the RAM 13 functions to temporarily store data and programs required by the CPU 11 to execute various processes. The RAM 13 includes a hull point memory area 131, an input-end color gamut data memory area 132, and an output-end color gamut data memory area 133

In the embodiment, points plotted in the L*a*b* color space 60 based on measured values (L*a*b* values) that are found in advance by measuring colors outputted by the device (inputting printer 30 or outputting printer 50) are called measurement points. The distributed range of these measurement points corresponds to the color gamut of the device. Among all the measurement points projected on the hue cross section (right side of FIG. 7(*a*)), measurement points that fall on a hull boundary (FIG. 7(*b*)) will be referred to as "hull points" hereinafter. The hull point memory area 131 stores the hull points.

FIGS. 7(*a*)-7(*c*) illustrate the hue cross section 61 and hull points 64. As shown in FIG. 7(*a*), the hue cross section 61 has a fixed hue angle in a color space 60 and is defined as a plane including all points on an achromatic axis 63. For simplicity, only a portion of the hull points 64 are labeled with reference numbers in FIG. 7(*b*), 7(*c*).

The color data processor 10 according to the embodiment employs a technique (the conventional flexible sequential LGB method) for dividing the color space 60 into a plurality of hue angles ($\phi$ of 9° in this example), projecting the measurement points included in each divided region on the hue cross section 61 included in the divided region and finding the distributed range of the measurement points as a color gamut 62 for the hue angle.

More specifically, the color data processor 10 defines one hue cross section 61 and projects all measurement points within the prescribed range relative to the hue cross section 61 onto the hue cross section 61. Here, $\phi$ is the hue angle of the hue cross section 61. Next, the color data processor 10 finds hull points 64 among the measurement points projected onto the hue cross section 61.

FIG. 7(*b*) shows the hull points 64 in the hue cross section 61. As shown in FIG. 7(*b*), the hull points 64 are configured of vertices of a polygon formed to include all measurement points projected onto the hue cross section 61. These hull points 64 can be extracted by executing a hull point extraction process (S54) described later with reference to FIG. 12. The hull points 64 are stored in the hull point memory area 131, and the color data processor 10 according to the embodiment defines the domain generated by connecting points stored in the hull point memory area 131 as the color gamut 62 corresponding to the hue angle $\phi$.

Returning to FIG. 6, the input-end color gamut data memory area 132 stores color gamut data representing the color gamut 62 for the inputting printer 30. The output-end color gamut data memory area 133 stores color gamut data representing the color gamut 62 for the outputting printer 50. The color data processor 10 according to the embodiment uses a polar coordinate system to represent the surface of the color gamut 62 determined from the hull points 64.

FIG. 7(*c*) illustrates the polar coordinate system representing the surface of the color gamut 62. As shown in FIG. 7(*c*), one point on the achromatic axis 63 is set as a point of origin O. The surface of the color gamut 62 can be represented by a radius r representing the distance from the point of origin O, and an angle of deviation $\theta$ from an OX axis 66 orthogonal to the achromatic axis 63. Polar coordinate data representing the radius r and angle of deviation $\theta$ is stored in the input-end color gamut data memory area 132 or on the outputting printer 50 as hue data representing the color gamut 62.

The HUD 14 shown in FIG. 6 is a hard disk drive and stores an RGB-to-RGB' table 141. Here, the RGB-to-RGB' table 141 will be described with reference to FIG. 8(*a*). FIG. 8(*a*) conceptually illustrates the structure of the RGB-to-RGB' table 141. As shown in FIG. 8(*a*), the RGB-to-RGB' table 141 stores data indicating how to convert RGB data (RGB values) to RGB' data (RGB' values) to be outputted to the outputting printer 50 in order to match colors on the inputting printer 30 and outputting printer 50.

The color data processor 10 according to the embodiment reads RGB data inputted into the inputting printer 30 via a network 20, converts this RGB data to RGB' data using the RGB-to-RGB' table 141, and outputs the RGB' data to the outputting printer 50, thereby approximately matching the overall appearance of images formed on the inputting printer 30 based on RGB data with the overall appearance of images formed on the outputting printer 50 based on RGB' data. The RGB-to-RGB' table 141 is created using color gamut data for the inputting printer 30 and color gamut data for the outputting printer 50. This process for creating the RGB-to-RGB' table 141 is well known in the art and will not be described in detail herein.

The input device 15 shown in FIG. 6 is configured of a keyboard, a mouse, and the like used for inputting data and commands into the color data processor 10. The display device 16 displays text and images that aid the user in visually confirming data inputted into the color data processor 10 and the state of operations executed on the color data processor 10. The display device 16 is configured of a CRT display or a liquid crystal display, for example.

The network interface (I/F) 18 connects the color data processor 10 to the network 20 and controls data inputted from or outputted to the inputting printer 30 or outputting printer 50 via the network 20.

As shown in FIG. 6, the CPU 11, the ROM 12, the RAM 13, the HDD 14, the input device 15, the display device 16, and the network interface is described above are interconnected via a bus line 19.

The inputting printer 30 is connected to the color data processor 10 described above via the network 20. The inputting printer 30 includes a CPU 31, a ROM 32, a RAM 33, an image-forming unit 34, and an interface 37 (I/F 37). The outputting printer 50 is also connected to the color data processor 10 via the network 20. The outputting printer 50 includes a CPU 51, a ROM 52, a RAM 53, an image-forming unit 54, and an interface 57 (I/F 57). Since the inputting printer 30 and outputting printer 50 are both configured of a printer well known in the art, that is, the CPU 31, the ROM 32, the RAM 33, the image-forming unit 34, and an interface 37 (I/F 37) correspond respectively to the CPU 51, the ROM 52, the RAM 53, the image-forming unit 54, and the interface 57 (I/F 57), only the structure of the inputting printer 30 will be described below.

The CPU 31 controls the operations of the inputting printer 30 by executing various programs. The ROM 32 stores programs for controlling operations of the inputting printer 30. The ROM 32 of the inputting printer 30 also stores an RGB-to-Lab table 321. Here, the ROM 52 of the outputting printer 50 stores an RGB-to-Lab table 521.

FIG. 8(*b*) conceptually illustrates the structure of the RGB-to-Lab table 321. As shown in FIG. 8(*b*), the RGB-to-Lab table 321 correlates RGB values, which are made from combinations of nine values for each of the RGB colors that are arranged at intervals of 32 (0, 32, 64, 96, 128, 160, 192, 224, and 255, for example) with L*a*b* values which are acquired by using the colorimeter to measure the colors of the patches that the printer 30 forms on a recording paper based on the RGB values. The L*a*b* values stored in the RGB-to-Lab table 321 can sufficiently cover the range of colors that can be rendered on the inputting printer 30 (i.e., the color gamut 62). The RGB-to-Lab table 321 is created and stored in the ROM 32 at the factory when manufacturing the inputting printer 30, for example. The structure of the RGB-to-Lab table 521 is the same as the the structure of the RGB-to-Lab table 321. The RGB-to-Lab table 521 is created and stored in the ROM 52 at the factory when manufacturing the inputting printer 30, for example.

The image-forming unit 34 shown in FIG. 6 is provided with a recording head (not shown) for ejecting ink droplets, a carriage (not shown) for reciprocating the recording head in a main scanning direction, and a conveying mechanism (not shown) for intermittently conveying the recording paper under the recording head as the recording head ejects ink droplets, for example. The image-forming unit 34 forms color images on the recording paper based on RGB data inputted via the network 20.

The interface 37 connects the inputting printer 30 to the network 20 and controls data inputted from and outputted to the color data processor 10 via the network 20.

As shown in FIG. 6, the CPU 31, ROM 32, RAM 33, image-forming unit 34, and interface 37 are interconnected via a bus line 39 (59 in the outputting printer 50).

Next, a color conversion table creating process executed on the color data processor 10 having the above construction will be described with reference to FIGS. 9 through 12. In this color conversion table creating process, the color data processor 10 creates color gamut data for each of the inputting printer 30 and outputting printer 50 and creates the RGB-to-RGB' table 141 (see FIG. 8(a)) based on this color gamut data. FIG. 9 is a flowchart illustrating steps in the color conversion table creating process.

As shown in FIG. 9, in S2 at the beginning of the color conversion table creating process, the CPU 11 of the color data processor 10 reads the RGB-to-Lab table 321 from the inputting printer 30. In S4 the CPU 11 executes a color gamut formation process for creating color gamut data for the inputting printer 30 based on the measured values (L*a*b* values) stored in the RGB-to-Lab table 321 and for storing the color gamut data in the input-end color gamut data memory area 132. This color gamut formation process will be described later.

In S6 the CPU 11 reads the RGB-to-Lab table 521 from the outputting printer 50. In S8 the CPU 11 executes another color gamut formation process to create color gamut data for the outputting printer 50 based on the measured values stored in the RGB-to-Lab table 521 and to store this color gamut data in the output-end color gamut data memory area 133. The color gamut formation process of S4 and S8 will be described below with reference to FIG. 10.

While the color data processor 10 in the embodiment is described as reading the RGB-to-Lab tables 321 and 521 stored on the printers 30 and 50 respectively, the invention is not limited to this configuration. For example, the color data processor 10 may be configured to acquire RGB-to-Lab tables provided by the printer vendor or the like through the Internet (not shown).

In S10 the CPU 11 compresses the color gamut for the inputting printer 30. In this process, the CPU 11 compresses the color gamut for the inputting printer 30 in accordance with the color gamut of the outputting printer 50. More specifically, the CPU 11 converts the L*a*b* values in the RGB-to-Lab table 321 read in S2 so that all L*a*b* values read from the RGB-to-Lab table 321 are included in the color gamut 62 of the outputting printer 50.

In S12 the CPU 11 finds the Lab-to-RGB relationship for the outputting printer 50. As described above, the ROM 52 of the outputting printer 50 stores the RGB-to-Lab table 521. Accordingly, the RGB-to-Lab table 521 can be used to find a Lab-to-RGB relationship indicating the relationship of RGB values to L*a*b* values. In other words, Lab-to-RGB relationship determines the RGB values for L*a*b* values that are arranged at uniform intervals, for example, in the L*a*b* space. Since the algorithm for finding this relationship is well known in the art, a detailed description of the process has been omitted.

Figure 8A:
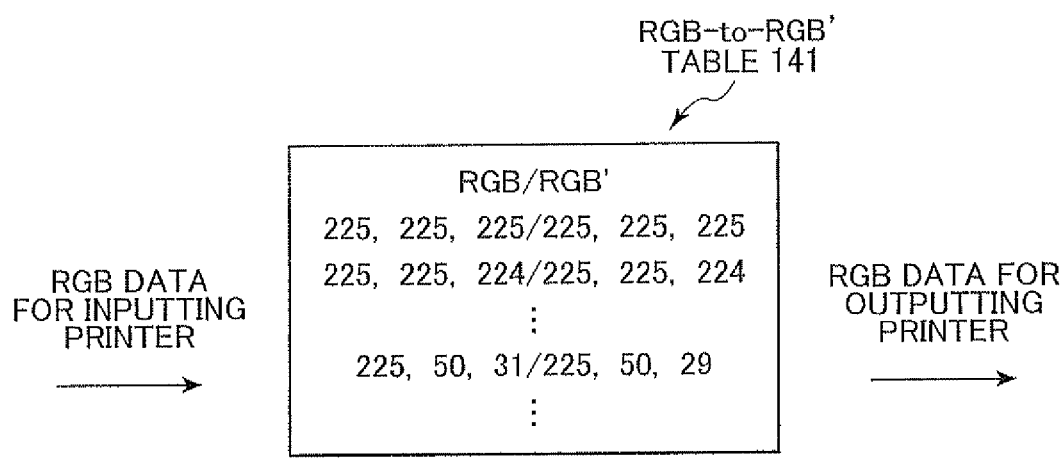
FIG. 8(a) conceptually illustrates a structure of an RGB-to-RGB' table.
Figure 8B:
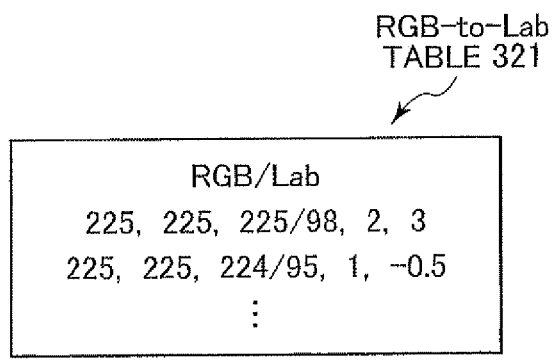
FIG. 8(b) conceptually illustrates a structure of an RGB-to-Lab table.

In S14 the CPU 11 creates the RGB-to-RGB' table 141 (see FIG. 8(a)) using the RGB-to-Lab table 321 of the inputting printer 30 subjected to gamut compression in S10, and the Lab-to-RGB relationship for the outputting printer 50 found in S12. As described above, by performing in S10 gamut compression on the RGB-to-Lab table 321 for the inputting printer 30, all L*a*b* values now listed in the RGB-to Lab table 321 fall within the color gamut 62 of the outputting printer 50. Therefore, the CPU 11 can create the RGB-to-RGB' table 141 by combining the L*a*b* values in the RGB-to-Lab table 321 with L*a*b* values in the Lab-to-RGB relationship for the outputting printer 50 found in S12.

The CPU 11 stores the RGB-to-RGB' table 141 created in the color conversion table creating process on the HDD 14 of the color data processor 10. The RGB-to-RGB' table 141 enables the color data processor 10 to match colors in images formed on the inputting printer 30 and images formed on the outputting printer 50.

Figure 10:
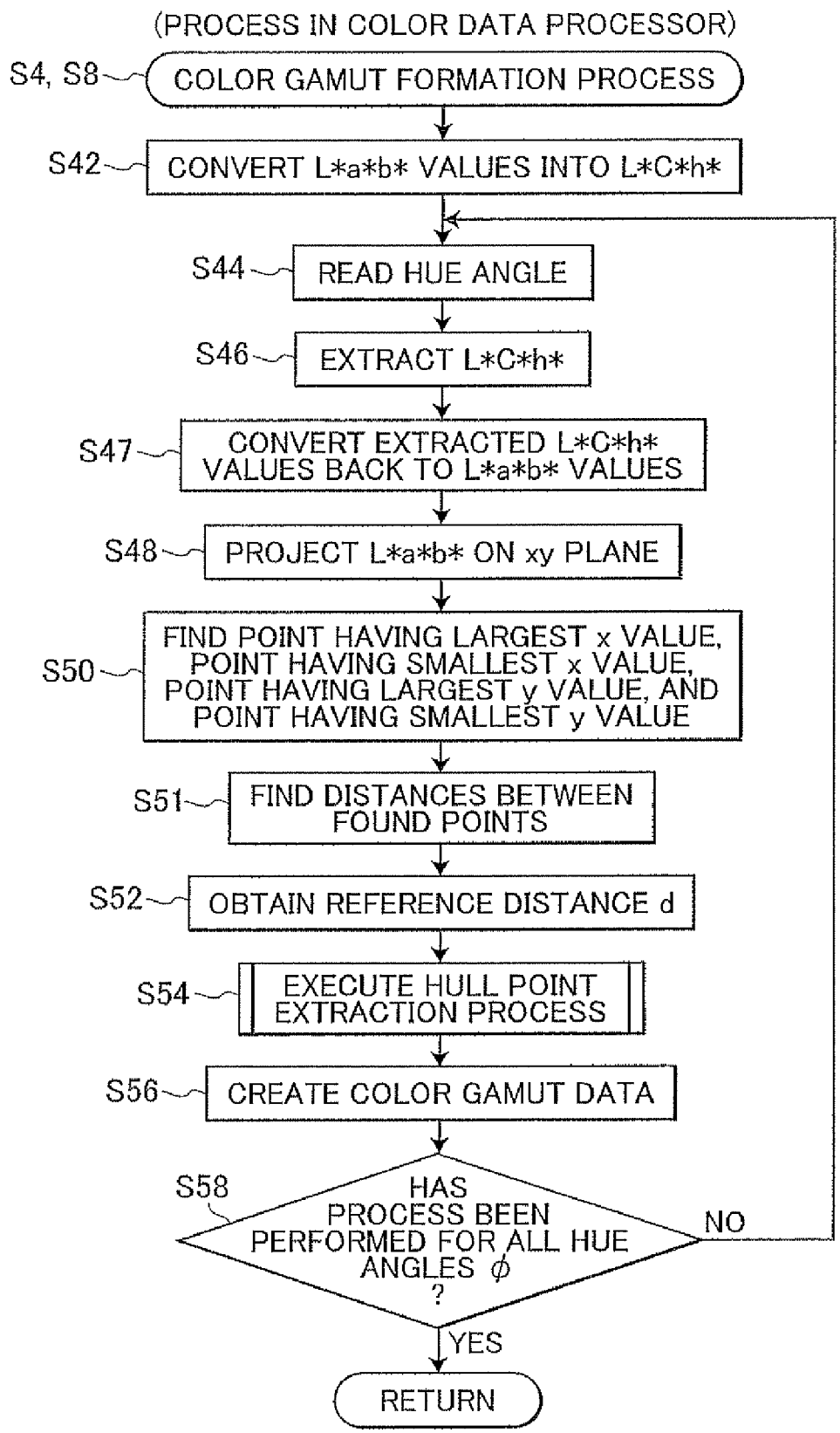
FIG. 10 is a flowchart illustrating steps in a color gamut formation process.

Next, the color gamut formation processes of S4 and S8 executed on the color data processor 10 will be described with reference to FIG. 10. Both the color gamut formation processes S4 and S8 are the same process for crating the color gamut data. That is, the color gamut formation process 34 crates the color gamut data for the inputting printer 30, and the color gamut formation process of S8 creates the color gamut data for the outputting printer. FIG. 10 is a flowchart illustrating steps in these processes. The color gamut formation process of S4 executed after the CPU 11 reads the RGB-to-Lab table 321 from the inputting printer 30 is performed to create color gamut data for the inputting printer 30. The color gamut formation process of S8 executed after the CPU 11 reads the RGB-to-Lab table 521 from the outputting printer 50 is performed to create color gamut data for the outputting printer 50. Thus, the color gamut formation processes of S4 and S8 are the same process.

In S42 of the color gamut formation process, the CPU 11 converts, to L*C*h* values, measured values (L*a*b* values) included in the RGB-to-Lab table 321 or 521 read in the previous step. Here, C* represents hue, and h* represents hue angle.

In S44 the CPU 11 reads a single hue angle φ from the plurality of hue angles recorded in the hue angle list 121. In S46 the CPU 11 extracts L*C*h* values, whose h* values indicative of hue angles fall within a range from φ−4.5° to φ+4.5°, or a range from (φ+180°)−4.5° to (φ+180°)+4.5°. In S47, the CPU 11 converts the extracted L*C*h* values back to L*a*b* values. Since the hue cross section 61 along the hue angle φ and the hue cross section 61 along the hue angle (φ+180°) are the same plane, in the first embodiment, the measurement points having hue angles within range from φ−4.5° to φ+4.5° and within the range from (φ+180°)−4.5° to (φ+180°)+4.5° are simultaneously processed. In other words, the color data processor 10 simultaneously processes the hue angle φ and the hue angle (φ+180°). Both the measurement points within the range from φ−4.5° to φ+4.5° and the measurement points within the range from (φ+180°)−4.5° to (φ+180°)+4.5° are projected onto the hue cross section 61 at the hue angle φ.

In S48, the CPU 11 converts the extracted L*a*b* values to two-dimensional coordinate data expressed in a two dimensional Cartesian coordinate system (XY-coordinate system). This coordinate data indicates the positions of the measurement points in the hue cross section 61 when the measurement points plotted in the L*a*b* color space 60 according to the extracted L*a*b* values are projected onto the hue cross section 61 at the hue angle φ.

Based on coordinate data for all the measurement points obtained in S48, in S50 the CPU 11 extracts a measurement point $65_{xmax}$ having the largest x coordinate x_max, a measurement point $65_{ymax}$ having the largest y coordinate y_max, a measurement point $65_{xmin}$ having the smallest x coordinate x_min, and a measurement point $65_{ymin}$ having the smallest y coordinate y_min from the coordinate data obtained in the above conversion in S48.

Figure 11:
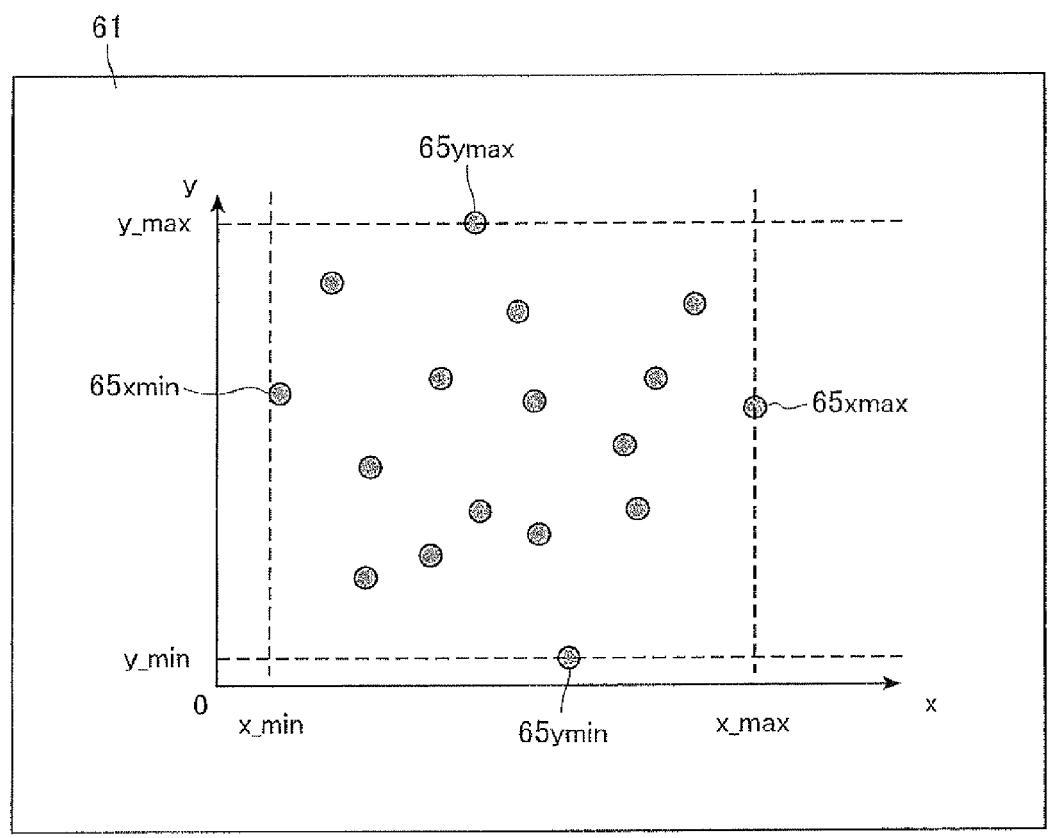
FIG. 11 shows a hue cross section, and an xy-coordinate system established on the hue cross section.

FIG. 11 shows the hue cross section 61, and the xy-coordinate system established in the hue cross section 61. As shown in FIG. 11, among the measurement points projected on the hue cross section 61, the measurement points $65_{xmax}$, $65_{ymax}$, $65_{ymin}$, and $65_{ymin}$ extracted in S50 all correspond to hull points 64 forming the color gamut 62.

Returning to FIG. 10, in S51 the CPU 11 finds distances between the measurement points $65_{xmax}$, $65_{ymax}$, $65_{xmin}$, and $65_{ymin}$, extracted in S50. Specifically, the CPU 11 finds the distance between measurement point $65_{xmax}$ and measurement point $65_{ymax}$, the distance between measurement point $65_{ymax}$ and measurement point $65_{ymin}$, the distance between measurement point $65_{xmin}$ and measurement point $65_{ymin}$, and the distance between measurement point $65_{ymin}$ and measurement point $65_{xmax}$.

In S52 the CPU 11 stores the largest of the distances found in S51 as a maximum distance D, and a value equivalent to ⅓ the maximum distance D as a reference distance d in the RAM 13. The reference distance d will be described in detail later, since this value is used in the hull point extraction process (S54) described later.

In S51 the CPU 11 may finds distances for all the combination of two points selected from the $65_{xmax}$, $65_{ymax}$, $65_{xmin}$, and $65_{ymin}$, and in S52 stores the largest distance as the maximum distance D from among distances for all the combination of two points selected from the $65_{xmax}$, $65_{ymax}$, $65_{xmin}$, and $65_{ymin}$.

Next, in S54 the CPU 11 executes the hull point extraction process to extract hull points defining the color gamut 62. This process will be described later with reference to FIG. 12.

In S56 the CPU 11 creates color gamut data configured of polar coordinate data representing the surface of the color gamut 62 using coordinate data for the hull points extracted in S54, and stores this color gamut data in the input-end color gamut data memory area 132 (when the color gamut formation process is executed in S4) or output-end color gamut data memory area 133 (when the color gamut formation process is executed in S8). In S58 the CPU 11 determines whether the above process has been performed for all hue angles φ recorded in the hue angle list 121. The CPU 11 returns to S44 and repeats the above process when unprocessed hue angles φ remain (S58: NO).

If the CPU 11 determines in S58 after repeatedly performing the above process that the process has been performed for all hue angles φ recorded in the hue angle list 121 (S58: YES), the CPU 11 ends the color gamut formation process.

Through the color gamut formation process described above, the CPU 11 can create color gamut data for the inputting printer 30 or for the outputting printer 50 based on the RGB-to-Lab table 321 or 521 read just prior to the process.

Figure 12:
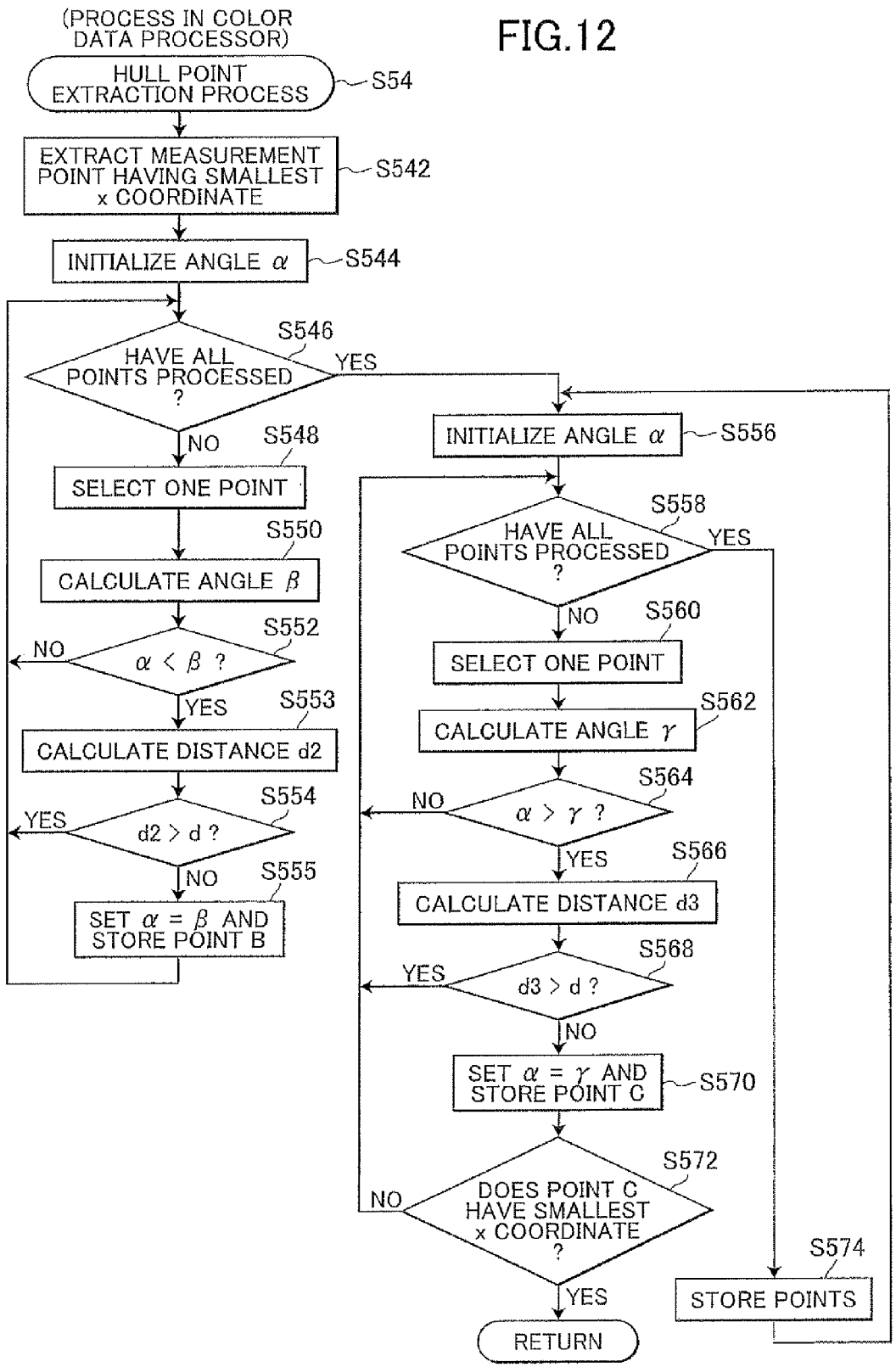
FIG. 12 is a flowchart illustrating steps in a hull point extraction process in the process of FIG. 10.

Next, the hull point extraction process of S54 executed on the color data processor 10 will be described with reference to FIG. 12. FIG. 12 is a flowchart illustrating steps in this process.

In S542 at the beginning of the hull point extraction process, the CPU 11 extracts the measurement point $65_{xmin}$ having the smallest x coordinate x_min, and stores this point in the hull point memory area 131 (see FIG. 6) as a point A. In S544 the CPU 11 initializes an angle α to 0°.

In S546 the CPU 11 determines whether all measurement points other than the point A have been processed. Since the CPU 11 initially reaches a negative determination (S546: NO), in S548 the CPU 11 selects one measurement point other than the point A and reads coordinate data for this point. In S550 the CPU 11 calculates an angle β indicating the positional relationship between the selected measurement point and the point A, based on the point A and the coordinate data read in S548.

Figure 13A:
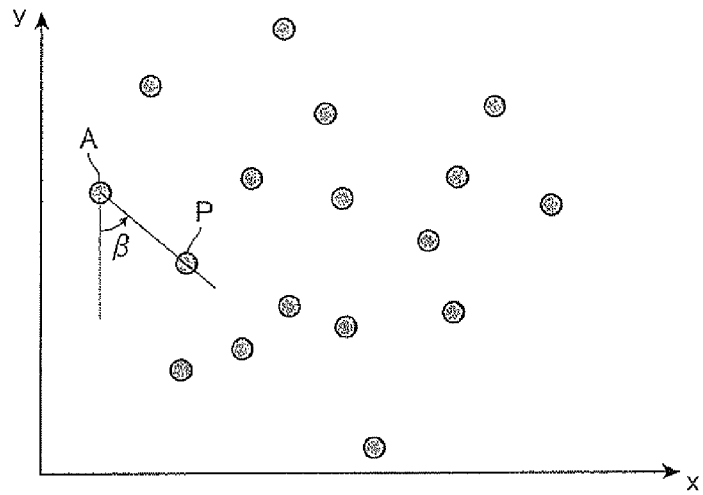
FIG. 13(a) is a graph illustrating an angle β.

FIG. 13(a) is a graph illustrating this angle β. As shown in FIG. 13(a), in the hull point extraction process of the embodiment the CPU 11 defines the angle β as an angle formed by a line connecting the selected point (a point P in FIG. 13(a)) and the point A and a line extending from the point A along the negative direction of the y-axis, a counterclockwise angle with the line extending in the negative direction of the y-axis set to 0°.

Returning to FIG. 12, in S552 the CPU 11 determines whether the angle β calculated in S550 is greater than the angle α. Since the angle α is initialized to 0° in the beginning, the CPU 11 determines that β is greater than α (S552: YES). In S553 the CPU 11 calculates a distance d2 from the point A to the selected measurement point. In S554 the CPU 11 determines whether the distance d2 calculated above is greater than the reference distance d. If the calculated distance d2 is greater than the reference distance d (3554: YES), indicating that the extracted point is too apart from the point A, the CPU 11 determines that this point should not be a hull point 64 adjacent to the point A and returns to S546.

However, if the calculated distance d2 is less than or equal to the reference distance d (S554: NO), indicating that the extracted (selected) point selected in S548 is sufficiently near the point A and, that this extracted (selected) point has a possibility to be a hull point 64 adjacent to the point A, in S555 the CPU 11 sets α as equal to the value of β (α=β) and stores the measurement point extracted in S548 in the RAM 13 as a point B. Subsequently, the CPU 11 returns to S546. Then in S548 the CPU 11 selects a next measurement point, reads coordinate data for this point, and repeats the process described above. By repeatedly performing this process, the CPU 11 can determine a measurement point having the maximum angle β as a point B from among all the projected points within the reference distance d from the point A on the hue cross section 61. That is, the selected measurement point is determined to be a hull point adjacent to the point A when the selected measurement point has the angle β (see FIG. 13(b)) of a maximum value from among all the projected points within the reference distance d from the point A on the hue cross section 61.

Figure 13B:
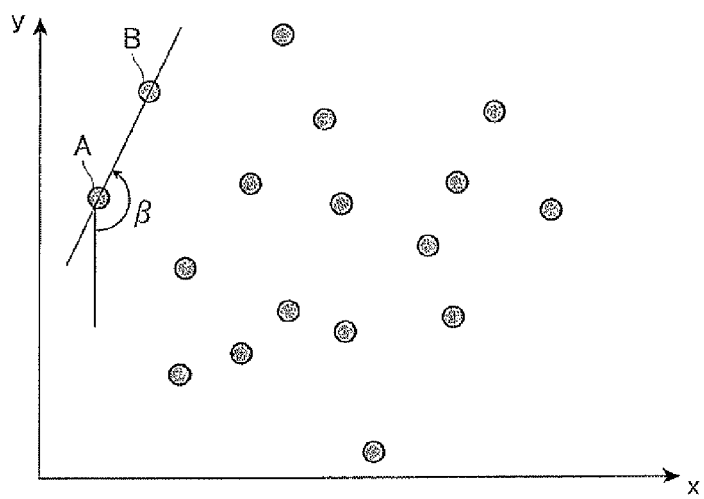
FIG. 13(b) shows a positional relationship of points A and B.

FIG. 13(b) shows the positional relationship of the points A and B. As shown in FIG. 13(b), a point B can be extracted as a hull point adjacent to the point A and defining the color gamut 62 by setting the point B to the measurement point having the largest angle β from among the projected points within the reference distance d from the point A on the hue cross section 61. Here, the specific method of performing calculations to extract point B is not limited to the method described above in S546-S555, provided that a measurement point can be found such that all points other than the points A and B and within the reference distance d from the point A are positioned on one side of a line passing through the points A and B. There are various possible methods of calculation. For example, a point B can be extracted such that the positive direction of the y-axis is set to 0°, and an angle β' counterclockwise from this y-axis to a line connecting the points A and B has a largest value from among all the measurement points within the reference distance d from the point A.

Returning to FIG. 12, when this process of S546-S555 for determining the point B has been performed for all measurement points other than the point A (S546: YES), in S556 the CPU 11 initializes the angle α to 360°. In S558 the CPU 11 determines whether all measurement points other than the point A have been processed in S558-S572. Since the CPU 11 reaches a negative determination initially (S558: NO), in S560 the CPU 11 selects one measurement points P other than the points A and B and reads coordinate data for this measurement point. In S562 the CPU 11 calculates an angle γ formed by the line connecting the selected measurement P and the point B and a line connecting the points A and B.

Figure 13C:
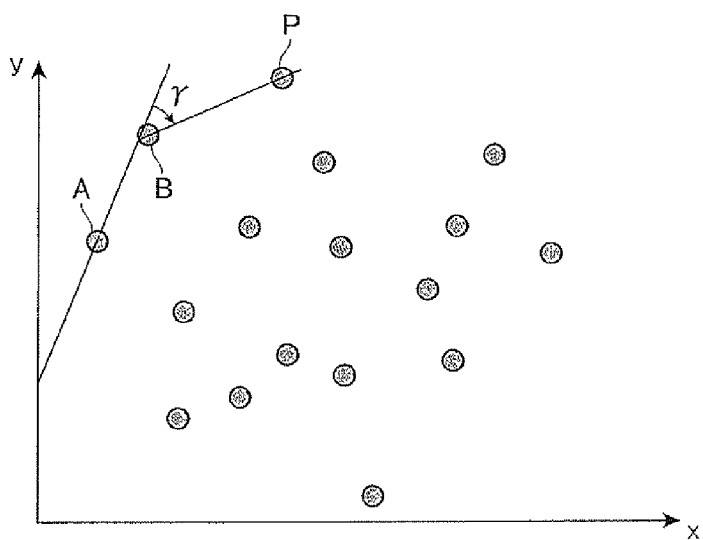
FIG. 13(c) shows a positional relationship between the points A and B and a newly selected measurement point P.

FIG. 13(c) shows the positional relationship between the points A and B and the newly selected measurement point (point P in FIG. 13(c)). As shown in FIG. 13(c), the angle γ is a clockwise angle (rightward) from the line connecting the points A and B to the line connecting the selected measurement point P and the point B.

Returning to FIG. 12, in S564 the CPU 11 determines whether the calculated angle γ is smaller than the angle α. Since the angle α is set initially to 360°, the CPU 11 determines that γ is smaller than α (S564: YES).

In S566 the CPU 11 calculates a distance d3 from the point B to the measurement point P selected in S560. In S568 the CPU 11 determines whether the calculated distance d3 is greater than the reference distance d. If the distance d3 is greater than the reference distance d (S568: YES), indicating that the selected point P is too far from the point B, then the CPU 11 determines that the selected point should not be a hull point adjacent to the point B and returns to S558.

However, in the calculated distance d3 is less than or equal to the reference distance d (S568: NO), indicating that the extracted (selected) point P is sufficiently near the point B and, that the selected point P has a possibility to be a hull point adjacent to the point B, in S570 the CPU 11 sets α to the value of γ (α=γ) and stores the measurement point extracted in S560 in the RAN 13 as a point C. In S572 the CPU 11 determines whether the point C is the measurement point $65_{xmin}$. Since the CPU 11 reaches a negative determination when not all hull points 64 have been extracted yet (S572: NO), the CPU 11 returns to S558 and repeats the process described above. By repeating the process of S558-S572 described above, the CPU 11 can set a point C to the measurement point having the smallest angle γ among all the projected points on the hue cross section 61 other than the points A and B that are separated from the point B by a distance no greater than the reference distance d.

Here, the specific method of calculation performed for extracting the point C is not limited to the method of calculation described above in S556-S574, provided that the CPU 11 can extract a measurement point C such that all measurement points, other than the points B and C, located within the reference distance d from the point B are positioned on one side of a line passing through the points B and C. For example, it is possible to extract a point C that produces cross products of the same sign (positive or negative), when calculating cross products of a vector from the point B to the point C and vectors from the point B to all the measurement points, other than the points B and C, that are located within the reference distance d from the point B.

After performing the above process on all measurement points (S558: YES), in S574 the CPU 11 sets the point B (the coordinate value of the current point B) as a new point A, sets the point C (the coordinate value of the current point C) as a new point B. Further, in S574 the CPU 11 stores coordinate data for these points in the hull point memory area 131. The hull points extracted as points A, B, and C are stored in the hull point memory area 131 in association with the order in which they have been extracted.

Next, the CPU 11 returns to S556 and repeats the process described above, i.e., a process for extracting a next point C with the previously extracted point C used as a new point B.

When the CPU 11 determines that the point C is the measurement point $65_{xmin}$ after repeatedly performing the above process (S572: YES), then the CPU 11 ends the hull point extraction process and returns to the color gamut formation process in FIG. 10. Accordingly, all the hull points are stored in the hull points memory area 131 in association with the order in which they have been extracted.

In the hull point extraction process of the embodiment described above, the CPU 11 can extract the hull points 64 as vertices of the color gamut such that the distance between neighboring vertices is no greater than the reference distance d and the cross product of a vector from a first hull point 64 to a neighboring hull point 64 and a vector from the first hull point 64 to another measurement point other than the neighboring hull point 64 is always positive or always negative, when the distance from the first hull point to the another measurement point is no greater than reference distance d. In other words, all measurement points other than hull points 64 within the reference distance d from a given hull point 64 must be positioned on one side of a line connecting the given hull point 64 to a neighboring hull point 64.

Figure 2A:
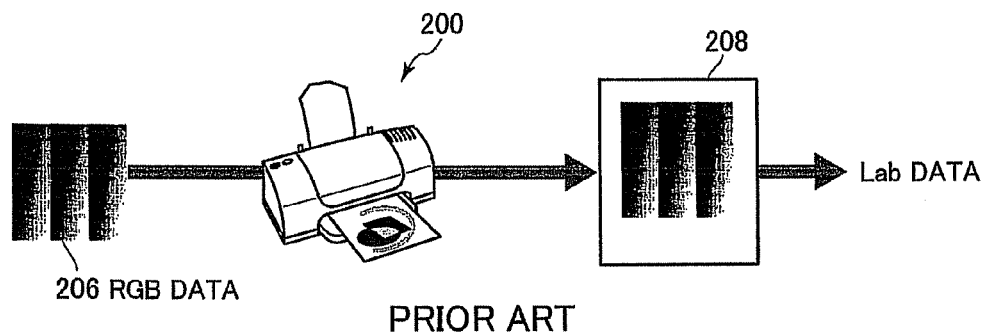
FIG. 2(a) conceptually illustrates a conventional inputting printer, an RGB data for a test pattern inputted into the inputting printer, and a recording paper on which the inputting printer forms color patches based on the inputted RGB data.
Figure 2B:
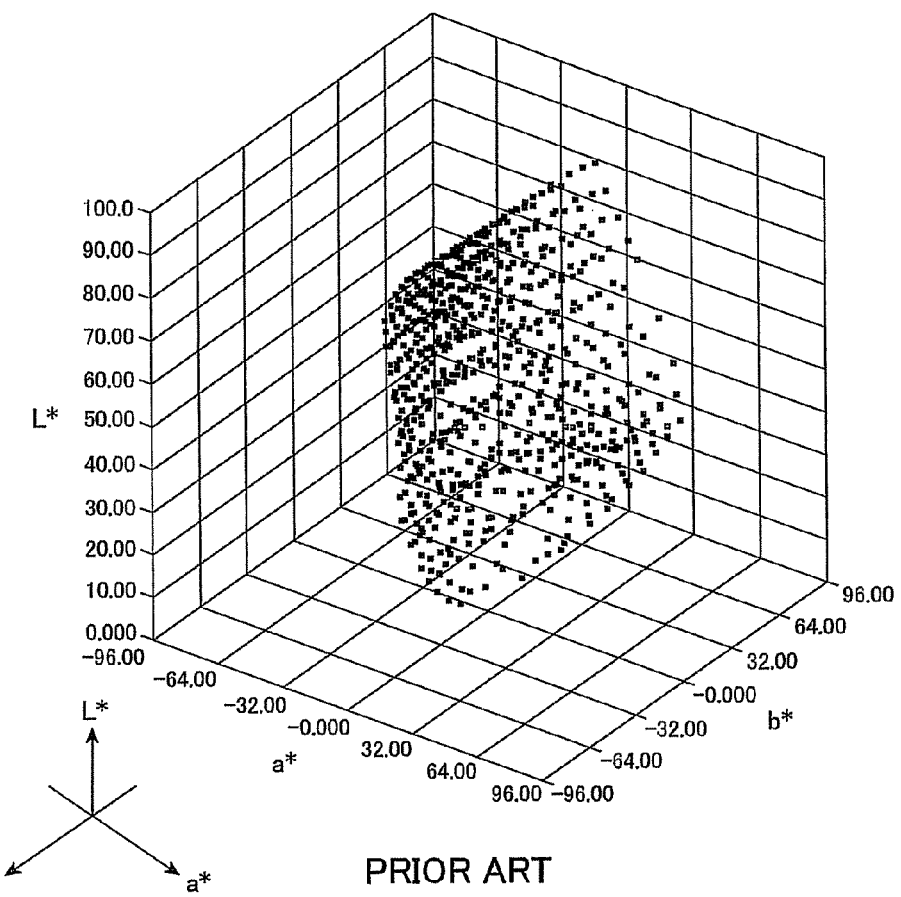
FIG. 2(b) shows color values that are obtained by measuring color patches and plotted in an L*a*b* color space.
Figure 3A:
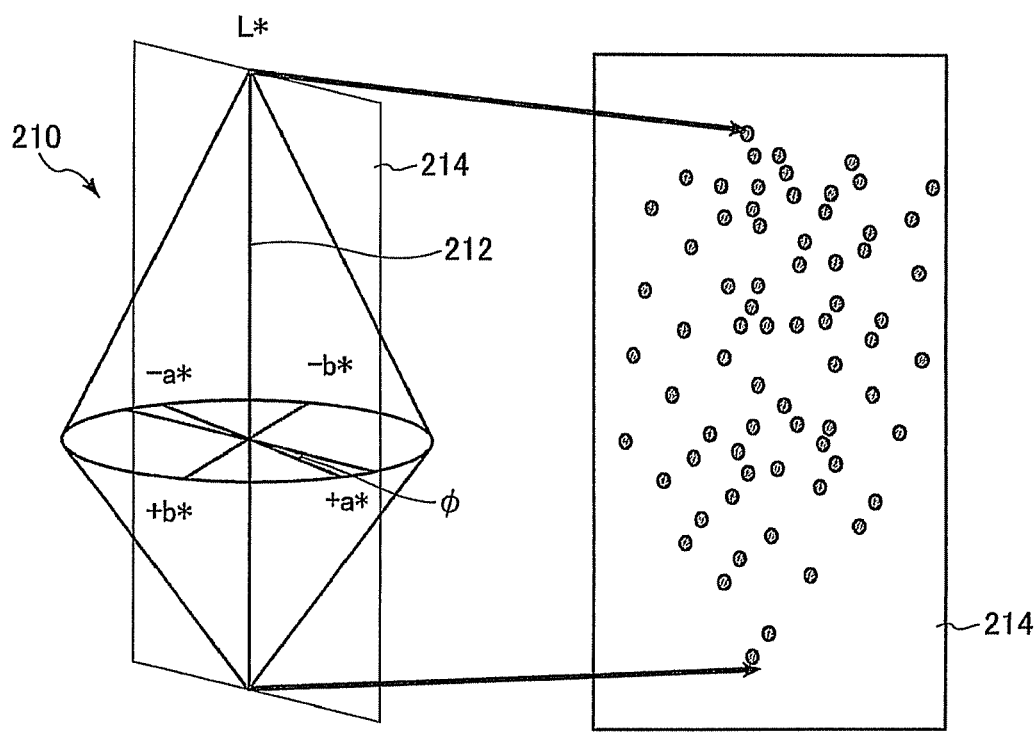
Figure 3B:
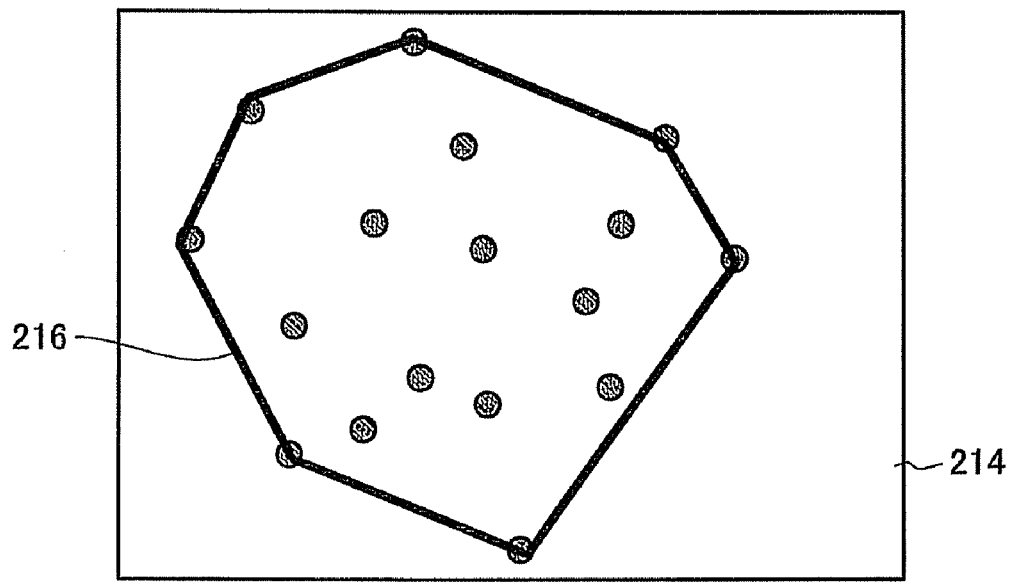
Figure 3C:
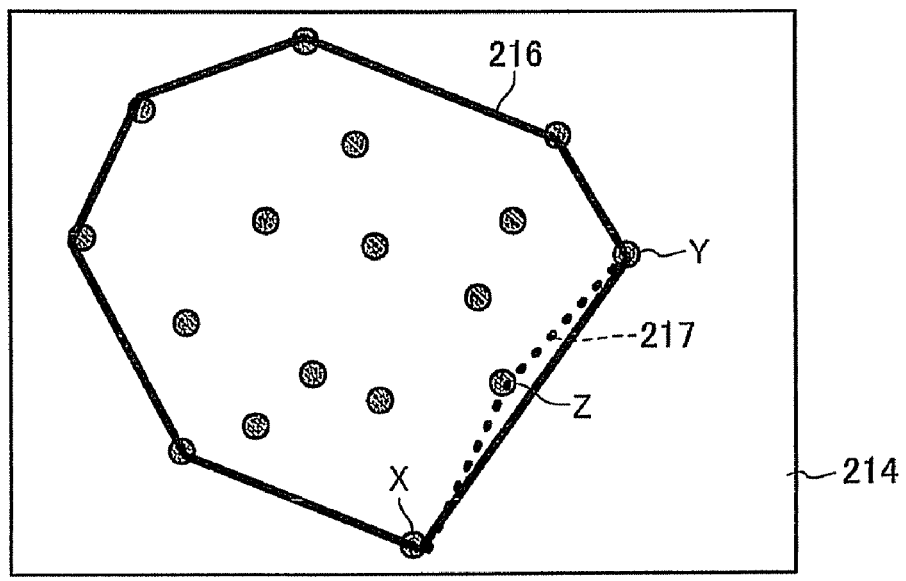
Figure 4A:
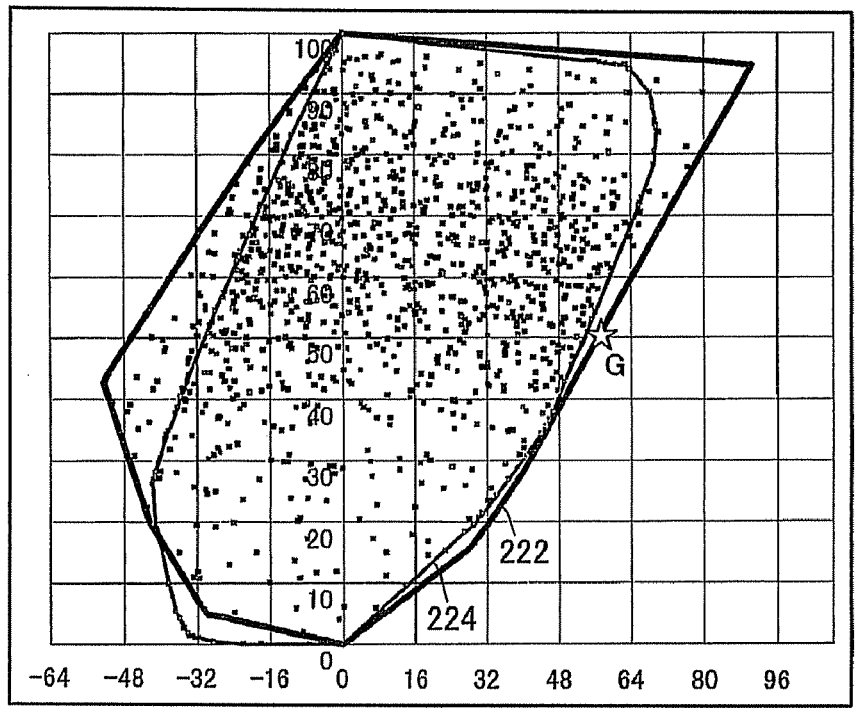
FIG. 4(a) shows a color gamut for the inputting printer formed as a convex hull encompassing the measurement points, and a color gamut for the outputting printer superimposed over the color gamut.
Figure 4B:
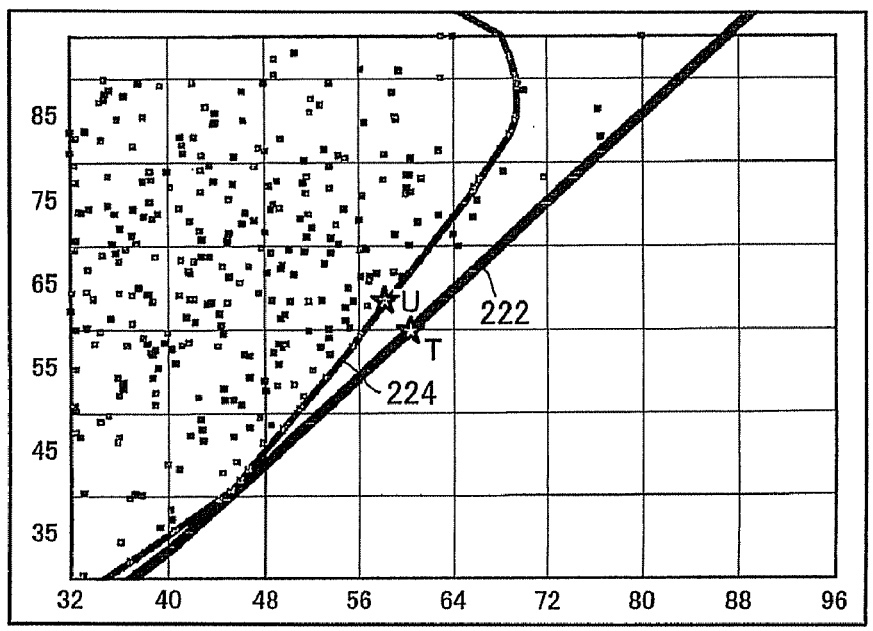
FIG. 4(b) is an enlarged view showing a portion of FIG. 4(a)
Figure 5:
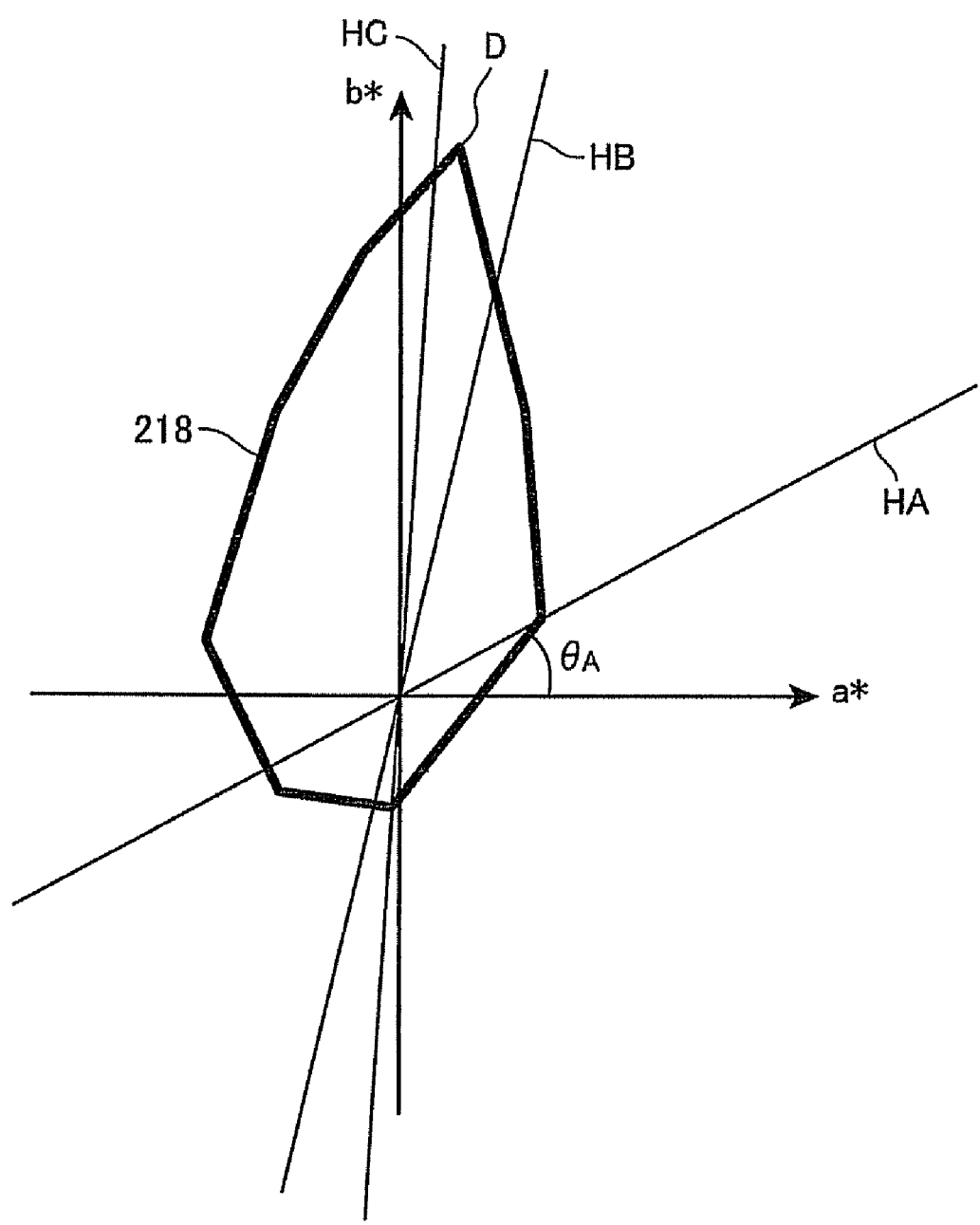
FIG. 5 shows an a*b* plane viewed from above the L*a*b* color space.
Figure 14A:
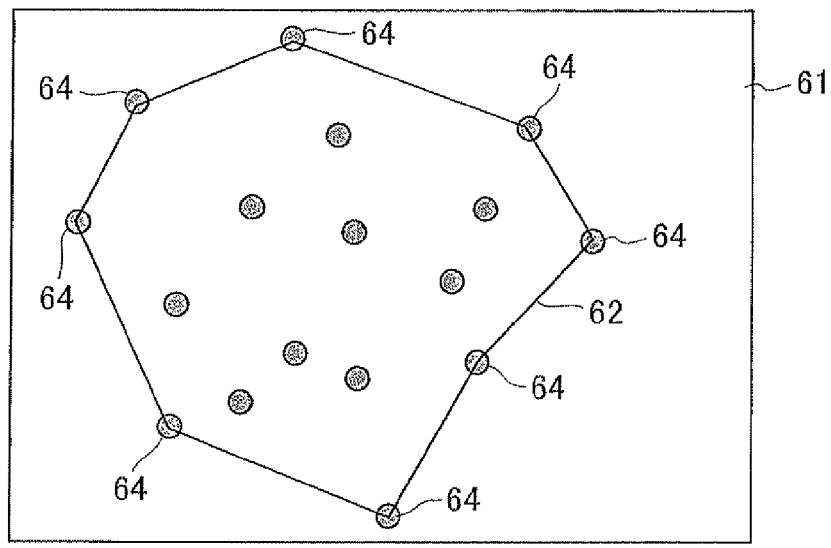
FIG. 14(a) shows a color gamut formed by connecting the hull points extracted in the hull point extraction process.

FIG. 14(a) shows the color gamut 62 formed by connecting the hull points 64 extracted in the hull point extraction process of S54 according to the embodiment. As shown in FIG. 14(a), since a condition of the hull point extraction process is that the distance between neighboring hull points 64 be no greater than the reference distance d, the hull points 64 can be extracted to represent some concave curvature in the color gamut 62. As shown in FIG. 3(c), since the conventional method cannot extract the point Z as a hull points, the color gamut 217 cannot represent concave curvature. That is, the conventional method is unable to represent concave curvature in the boundary of the gamut. However, in this embodiment, the color data processor 10 can create color gamut data that is capable of reproducing a color gamut faithfully based on the extracted hull points 64.

In the embodiment described above, the reference distance d is set to ⅓ of the maximum distance D as an example. However, the color data processor 10 can extract the hull points 64 sufficient for representing concave curvature using a reference distance d set between ⅓ and ½ the maximum distance D.

Further, after one hull point 64 is extracted as a point C in the hull point extraction process of S54, a hull point 64 adjacent to this first hull point 64 is extracted as the next point C. By storing the hull points 64 in the hull point memory area 131 together with the order in which the hull points 64 are extracted, the color data processor 10 can easily determine how to connect the extracted hull points 64 to form a closed color gamut 62.

Figure 14B:
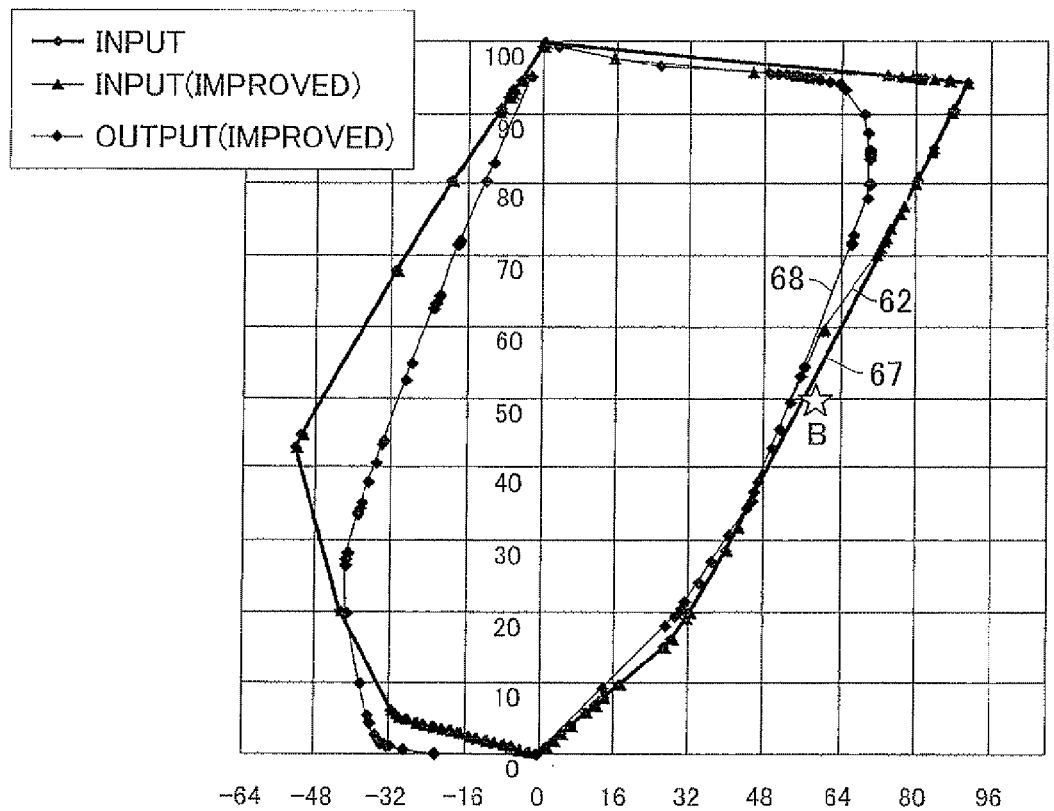
FIG. 14(b) a graph comparing a color gamut for an inputting printer formed by connecting vertices of a conventional convex hull, a color gamut for the inputting printer formed according to color gamut data created according to the color gamut formation process of the embodiment, and a color gamut for an outputting printer 50 created according to the color gamut formation process of the embodiment.

FIG. 14(b) compares a color gamut 67 for the inputting printer 30 formed by connecting vertices of a conventional convex hull that is a polygon whose interior angles is less than 180°, the color gamut 62 for the inputting printer 30 formed according to color gamut data created according to the color gamut formation process S4 (color conversion table creating process) of the embodiment, and a color gamut 68 for the outputting printer 50 created according to the color gamut formation, process S8 (color conversion table creating process) of the embodiment. As described above, the color data processor 10 can reproduce concave curvature in the color gamut 62 based on color gamut data according to the color gamut formation process of the embodiment. Thus, the color gamut 62 is created more faithfully than the color gamut 67 formed by simply connecting vertices of a convex hull. Accordingly, the color data processor 10 can more effectively utilize the entire color gamut 68 of the outputting printer 50 without wastefully using the color gamut 68 of the outputting printer 50 to compress colors that do not actually exist.

First Modification of First Embodiment

While the color data processor 10 according to the first embodiment described above determines the hull points 64 for each hue cross section 61 by projecting measurement points onto the hue cross section 61, the color data processor 10 may be configured to find the hull points 64 in three-dimensional measurement positions rather than projecting the measurement points on the hue cross section 61.

Figure 15A:
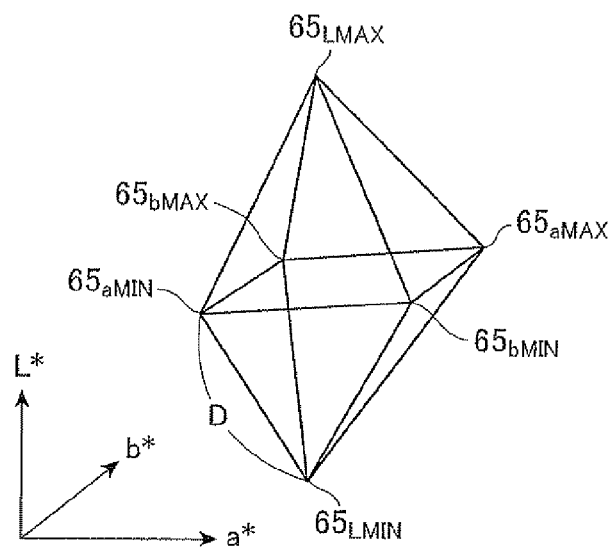
FIG. 15(a) illustrates the hull point extraction process according to a first modification of the first embodiment to create a color gamut of a three-dimensional closed space encompassing measurement points.
Figure 15B:
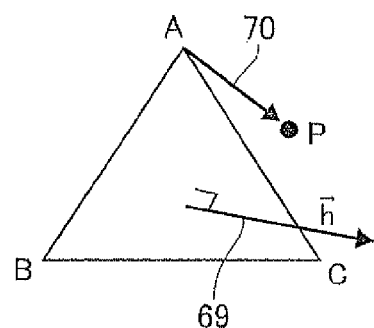
FIG. 15(b) illustrates the modification of the hull point extraction process.
Figure 15C:
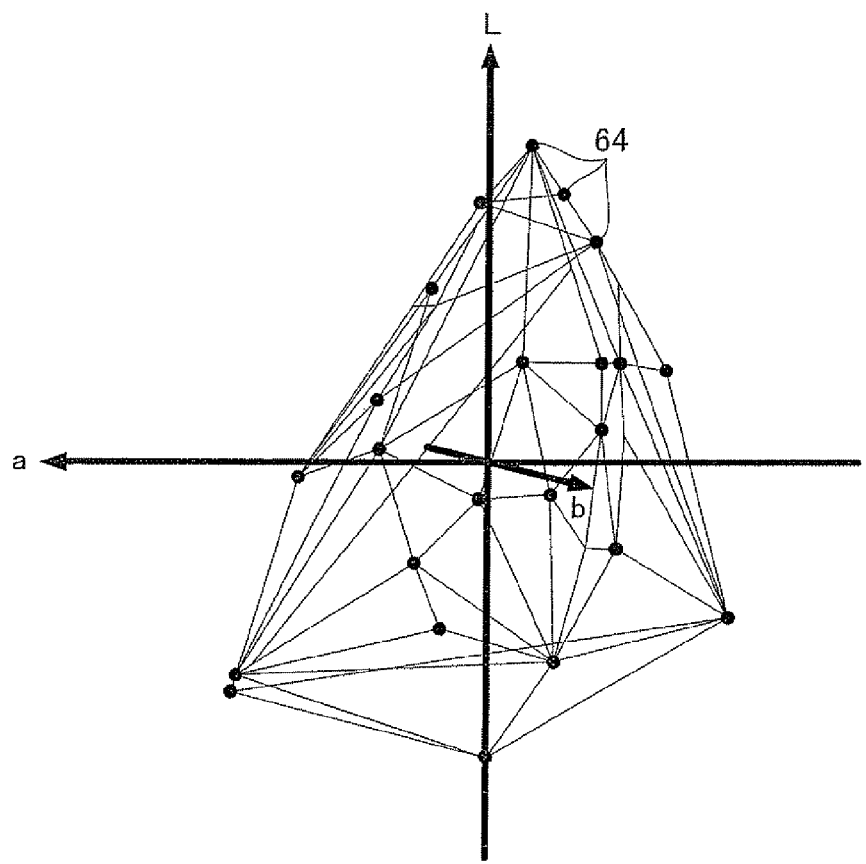
FIG. 15(c) illustrates the modification of the hull point extraction process.

FIGS. 15(a) through 15(c) illustrate a modification of the hull point extraction process to create a color gamut of a three-dimensional closed space encompassing measurement points. First, as shown in FIG. 15(a), the CPU 11 of the color data processor 10 determines the side length for at least one side of a tetrahedron, a pentahedron, a hexahedron, a heptahedron, or octahedron configured from a measurement point $65_{aMAX}$ having the largest a* coordinate, a measurement point $65_{aMIN}$ having the smallest a* coordinate, a measurement point $65_{bMAX}$ having the largest b* coordinate, a measurement point $65_{bMIN}$ having the smallest b* coordinate, a measurement point $65_{LMAX}$ having the largest L* coordinate, and a measurement point $65_{LMIN}$ having the smallest L* coordinate. Here, the octahedron is formed when all the six measurement points $65_{aMAX}$, $65_{aMIN}$, $65_{bMAX}$, $65_{bMIN}$, $65_{LMAX}$, and $65_{LMIN}$ have different values from one another. The tetrahedron, the pentahedron, the hexahedron, and the heptahedron are formed when some of the six measurement points $65_{aMAX}$, $65_{aMIN}$, $65_{bMAX}$, $65_{bMIN}$, $65_{LMAX}$, and $65_{LMIN}$ have the same value. When the CPU 11 determines only one side length for one side, the CPU 11 sets the reference distance d to a value smaller than the side length. Alternatively, when the CPU 11 determines side lengths for a plurality of sides, the CPU 11 sets the reference distance d to a value smaller than the maximum side length D among the determined side lengths. The CPU 11 begins the process with the measurement point $65_{LMAX}$ being set as the starting point A.

Next, as shown in FIG. 15(b), the CPU 11 acquires any two measurement points other than the point A as candidate points B and C. The candidate points B and C are measurement points that are located within the reference distance d from the point A, and the distance between the candidate points B and C is within the reference distance d. Nest, the CPU 11 finds a vector 69 normal to the plane ABC. The CPU 11 finds the relationship between the plane ABC and all the measurement points P that are within the reference distance d from the point A determines whether all points P fall on one side of the plane ABC. Specifically, the CPU 11 calculates, for each point P, the inner product of a vector 70 from the point A to the point P and the normal vector 69 and determines whether the scalar products for all points P have the same sign (negative or positive).

If the scalar products for all points P have the same sign, the CPU 11 determines the candidate points P and C as hull points 64.

Next, the CPU 11 sets the point B (value of the current point B) as a new point A, sets the point C (value of the current point C) as a new point B, and repeats the process to search for a plane ABC meeting the above conditions in this way, the CPU 11 can extract all hull points for the three-dimensional color gamut.

FIG. 15(c) shows a sample three-dimensional color gamut created by connecting the hull points 64 extracted according to the above technique. As shown in FIG. 15(c), by setting the reference distance d as a restriction in the above process, the color data processor 10 can extract the hull points 64 in concave regions of the three-dimensional gamut and can create more precise color gamut data than from a gamut formed by a convex hull.

Second Modification of First Embodiment

Next, a second modification of the embodiment will be described with reference to FIG. 16. In S556 through S574 of the hull point extraction process according to the embodiment described above, the color data processor 10 checks all measurement points and extracts the measurement point meeting the conditions as a point C. However, the color data processor 10 may reduce the number of measurement points checked according to the technique described below.

Figure 16:
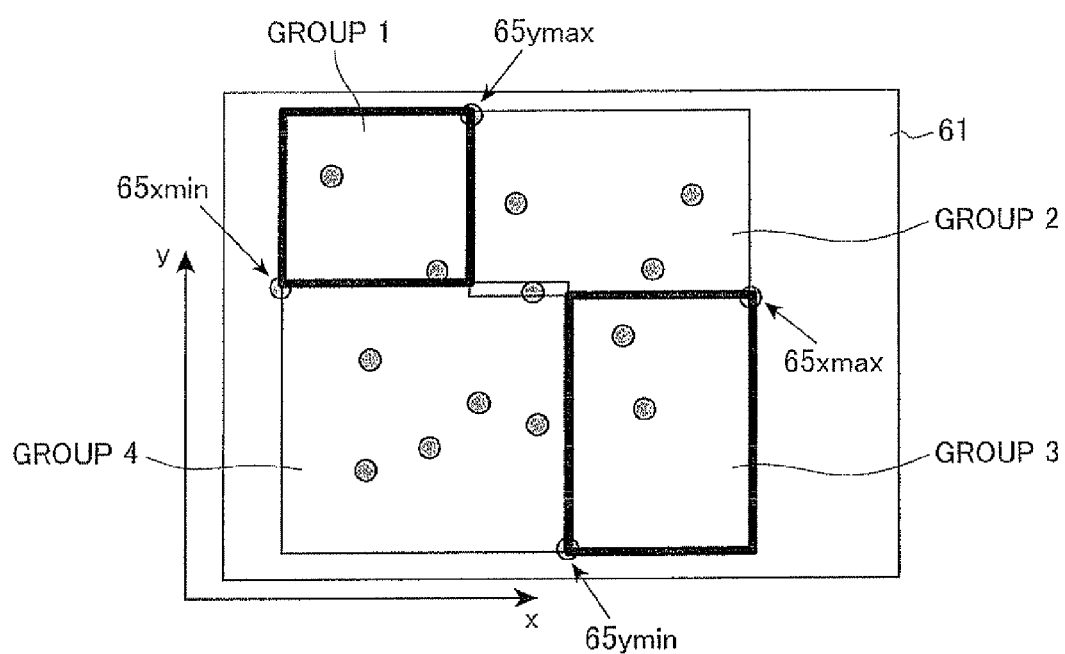
FIG. 16 shows measurement points projected onto a hue cross section in the hull point extraction process according to a second modification of the first embodiment.

FIG. 16 shows measurement points projected onto the hue cross section 61. As shown in FIG. 16, the CPU 11 of the color data processor 10 first sorts the measurement points projected onto the hue cross section 61 into four groups. Specifically, the CPU 11 sorts measurement points included in a rectangular region having the measurement point $65_{xmin}$ and the measurement point $65_{ymax}$ as diagonally opposing vertices into a Group 1, measurement points within a rectangular region having measurement point $65_{ymax}$ and measurement point $65_{xmax}$ as diagonally opposing vertices in a Group 2, measurement points within a rectangular region having measurement point $65_{xmax}$ and measurement point $65_{ymin}$ as diagonally opposing vertices into a Group 3, and measurement points within a rectangular region having measurement point $65_{ymin}$ and measurement point $65_{xmin}$ as diagonally opposing vertices into a Group 4.

The color data processor 10 targets only measurement points in the Group 1 when extracting hull points 64 between the measurement point $65_{xmin}$ and the measurement point $65_{ymax}$. That is, the color data processor 10 targets only measurement points in the Group 1 after the data processor 10 has found the measurement point $65_{xmin}$ (or $65_{ymax}$) as a hull point 64 and before the data processor 10 finds the measurement point $65_{ymax}$ (or $65_{xmin}$) as a hull point 64. The color data processor 10 targets only measurement points in the Group 2 when extracting hull points 64 between the measurement point $65_{ymax}$ and measurement point $65_{xmax}$. That is, the color data processor 10 targets only measurement points in the Group 2 after the data processor 10 has found the measurement point $65_{ymax}$ (or $65_{xmax}$) as a hull point 64 and before the data processor 10 finds the measurement point $65_{xmax}$ (or $65_{ymin}$) as a hull point 64. The color data processor 10 targets only measurement points in the Group 3 when extracting hull points 64 between the measurement point $65_{xmax}$ and measurement point $65_{ymin}$. That is, the color data processor 10 targets only measurement points in the Group 3 after the data processor 10 has found the measurement point $65_{xmax}$ (or $65_{ymin}$) as a hull point 64 and before the data processor 10 finds the measurement point $65_{ymin}$ (or $65_{xmax}$) as a hull point 64. The color data processor 10 targets only measurement points in the Group 4 when extracting hull points 64 between the measurement point $65_{ymin}$ and measurement point $65_{xmin}$. That is, the color data processor 10 targets only measurement points in the Group 4 after the data processor 10 has found the measurement point $65_{ymin}$ (or $65_{xmin}$) as a hull point 64 and before the data processor 10 finds the measurement point $65_{xmin}$ (or $65_{ymin}$) as a hull point 64. This method lightens the processing load by reducing the number of measurement points targeted for extracting a point C.

Third Modification of First Embodiment

Figure 17:
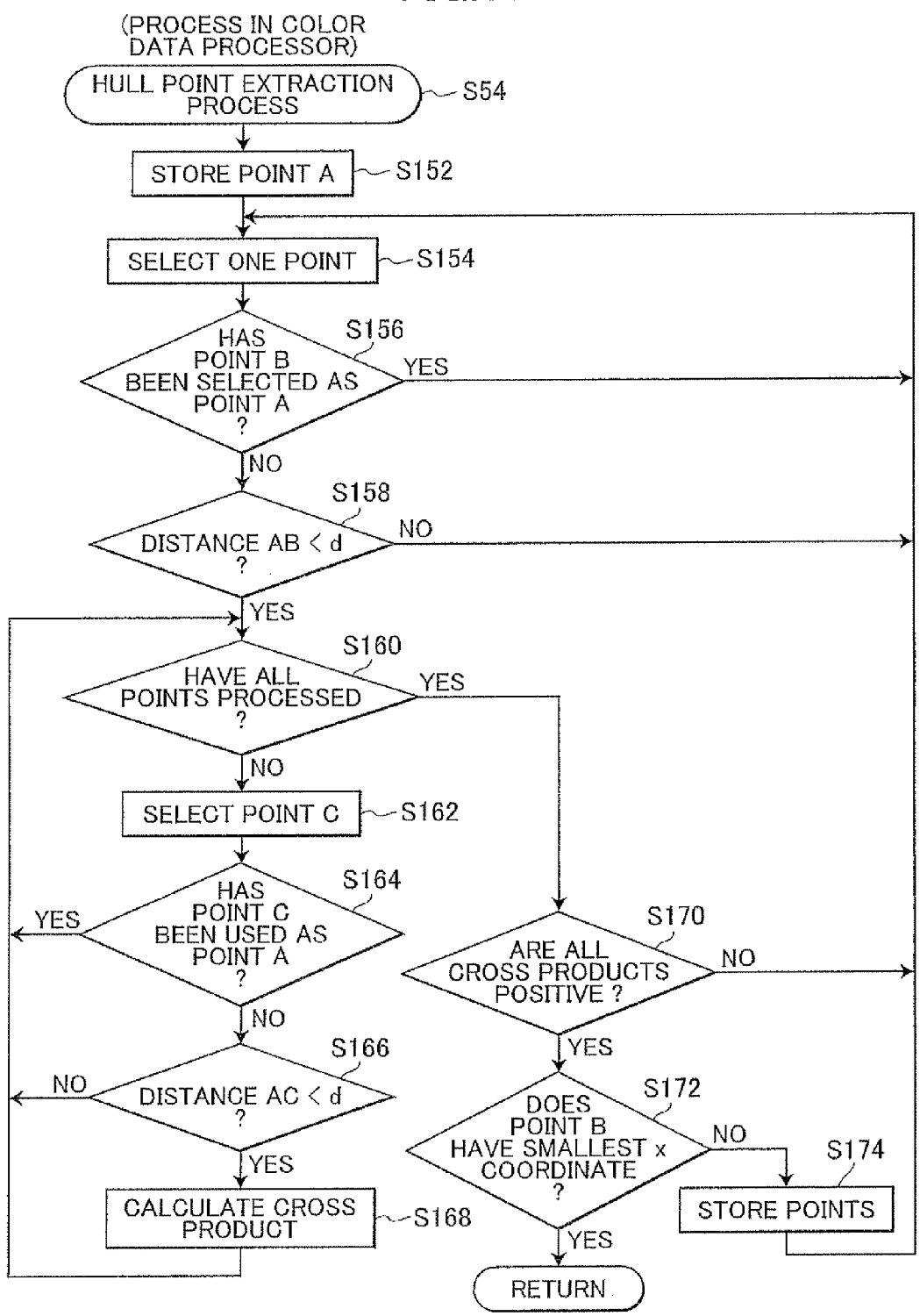
FIG. 17 is a flowchart showing an example f the hull point extraction process according to a third modification of the first embodiment.

FIG. 17 is a flowchart showing another modification of the hull point extraction process according to the first embodiment.

As shown in FIG. 17, in S152 the CPU 11 first extracts the measurement point $65_{xmin}$ having the smallest x coordinate x_min that has been previously extracted and stores this measurement point in the hull point memory area 131 as the point A.

In S154 the CPU 11 selects one measurement point as a point B. In S156 the CPU 11 determines whether the point B has ever been selected as the point A. If so (S156: YES), the CPU 11 returns to S154.

However, if the point 13 has never been used as the point A (S156; NO), in S158 the CPU 11 calculates the distance between the points A and B and determines whether this distance is smaller than the reference distance d. If the calculated distance is not smaller than the reference distance d (S158: NO), then the CPU 11 returns to S154.

However, if the calculated distance is less than the reference distance d (S158: YES), in S160 the CPU 11 determines whether all measurement points other than the points A and B have been processed. Since the CPU 11 reaches a negative determination in the first time when this step is performed (S160: NO), in S162 the CPU 11 selects a measurement point, other than the points A and B, as a point C and in S164 determines whether the point C has ever been used as the point A. If the point C has been used as the point A (S164: YES), the CPU 11 returns to S160.

However, if the point C has never been used as the point A (S164: NO), in S166 the CPU 11 calculates the distance between the points A and C and determines whether this distance is less than the reference distance d. If the calculated distance is not less than the reference distance d (S166: NO), the CPU 11 returns to S160.

However, if the CPU 11 determines that this distance is less than the reference distance d (S166: YES), then in S168 the CPU 11 calculates the cross product of a vector AB (the vector from the point A to the point B) and a vector AC (the vector from the point A to the point C) and stores this cross product in the RAM 13. Subsequently, the CPU 11 returns to S160.

After the CPU 11 has repeatedly performed the above process of S160-S168 for all measurement points other than the points A and B (S160: YES), in S170 the CPU 11 determines whether all cross products calculated in S168 are positive. If not all cross products are positive (S170: NO), then the CPU 11 determines that the point B is not a hull point 64 and returns to S154.

However, if all cross products are positive (S170: YES), in S172 the CPU 11 determines whether the point B is the measurement point $65_{xmin}$ having the smallest x coordinate. Since point B is not the measurement point $65_{xmin}$ initially (S172: NO), in S174 the CPU 11 sets the point B (the value of the current point B) to a new point A and stores coordinate data for the new point A in the hull point memory area 131 (see FIG. 6).

When the CPU 11 reaches a positive determination in S172 after repeatedly performing the above process (S172: YES), the CPU 11 ends the hull point extraction process.

After initially extracting the point A as a hull point 64 according to the modification of the hull point extraction process described above, the CPU 11 subsequently extracts a point B such that the cross products of a vector AB from the point A to the point B and vectors AC from the point A to points C other than the point A and the point B has the same sign for all the points C whose distance from the point A is no greater than the reference distance d. The process to extract a point B is repeatedly performed, thereby achieving the same effects as the embodiment described above.

In S170, the CPU 11 determines whether the all cross products are positive. However, the CPU 11 may determine whether the all cross products have the same sign.

In the third modification, the point B may be selected from among the part of the measurement points. More specifically, if the point A is positioned at the Group 1, the CPU 11 selects, as the point B, each of the points in the Group 1 that have an x coordinate value larger than the x coordinate value of the point A. If the point A is measurement point $65_{ymax}$, the CPU 11 selects, as the point B, each of the points in the Group 2 that have a y coordinate value smaller than the y coordinate value of the point A. If the point A is positioned at the Group 2, the CPU 11 also selects, as the point B, each of the points in the Group 2 that have a y coordinate value smaller than the y coordinate value of the point A. If the point A is the measurement point $65_{xmax}$, the CPU 11 selects, as the point B, each of the points in the Group 3 that have an x coordinate value smaller than the x coordinate value of the point A. If the point A is positioned at the Group 3, the CPU 11 also selects, as the point B, each of the points in the Group 3 that have an x coordinate value smaller than the x coordinate value of the point A. If the point A is the measurement point $65_{ymin}$, the CPU 11 selects, as the point B, each of the points in the Group 4 that have a y coordinate value larger than the y coordinate value of the point A. If the point A is positioned at the Group 4, the CPU 11 also selects, as another measurement point, each of the points in the Group 4 that have a y coordinate value larger than the y coordinate value of the point A. Accordingly, the CPU 11 appropriately extracts the hull point in a short time.

Fourth Modification of First Embodiment

Further, while the color data processor 10 extracts all the hull points in the hue cross section 61 through the hull point extraction process in the first embodiment described above, the color data processor 10 may instead extract only some of the hull points 64 (for example, the hull points 64 in the Groups 3 and 4 shown in FIG. 16) through S556-S574 of the hull point extraction process and may extract the remaining hull points (for example, the hull points 64 in the Groups 1 and 2 shown in FIG. 16) according to the conventional method, such as the Gift Wrapping method. This is possible because concave curvature in the color gamut is most commonly a problem with colors having low brightness.

Fifth Modification of First Embodiment

In the embodiment described above, the color data processor 10 executes the hull point extraction process of S54 on the hue cross sections 61 at all hue angles from 0° to 180° by an interval of 9°. However, the color data processor 10 may instead execute the hull point extraction process of S54 only on hue cross sections 61 for colors most likely to produce concave curvature in the color gamut, such as blue, while extracting hull points in the hue cross sections 61 for other colors according to the conventional process.

Second Embodiment

Figure 18:
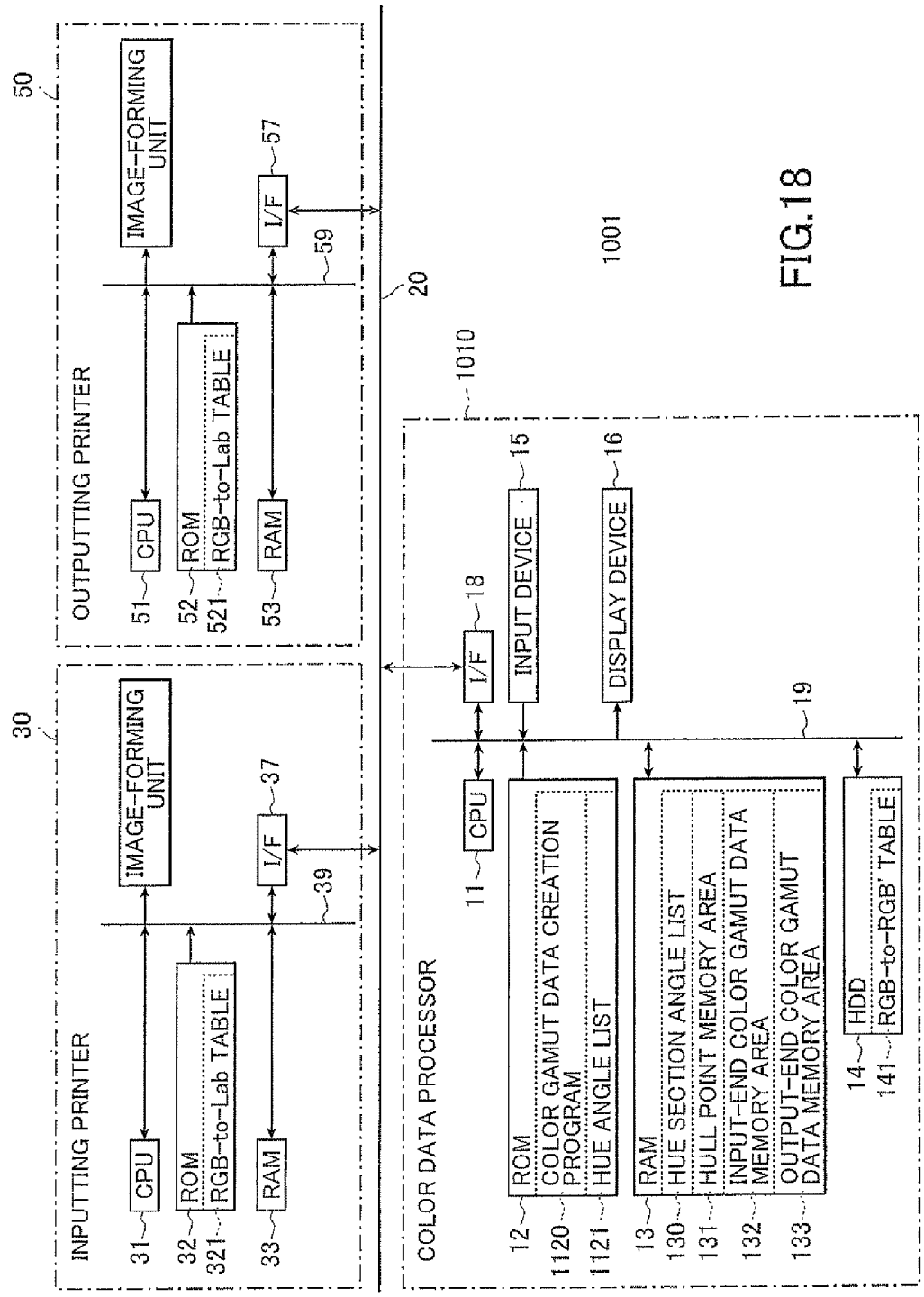
FIG. 18 is a block diagram showing an overall structure of a color data processing system provided with a color data processor according to a second embodiment.

Next, as shown in FIG. 18, a data processing system 1001 according to a second embodiment will be described wherein like parts and components are designated with the same reference numerals to avoid duplicating description. In the second embodiment, the data processing system 1001 is the same as the data processing system 1 of the first embodiment except for the data processor 10.

In the second embodiment, the data processing system 1001 includes a data processor 1010 instead of the data processor 10. The data processor 1010 is the same as the data processor 10 except for the configuration of the ROM 12 and the RAM 13. In the second embodiment, the ROM 12 stores a color gamut data creation program 1120 used to implement a process to be described in the flowcharts of FIGS. 19, 20, and 22, and a hue angle list 1121 describing a plurality of hue angles. The hue angle list 121 of the first embodiment describes hue angles from 0° to 180° by 9° increments. The hue angle list 1121 of the second embodiment describes hue angles from 0° to 360° by predetermined increments, for example, 9° increments.

Further, in the second embodiment, the RAM 13 includes a hue section angle list 130 as well as the hull point memory area 131, the input-end color gamut data memory area 132, and the output-end color gamut data memory area 133.

The hue section angle list 130 is a list describing hue angles of a plurality of hue cross sections 61, one of which is described with reference to FIGS. 23(*a*)-23(*c*). The color data processor 1010 according to the second embodiment employs a technique to render a color gamut for the hue cross section 61 at each hue angle that is recorded in the hue section angle list 130 through a process of FIG. 20.

Figure 19:
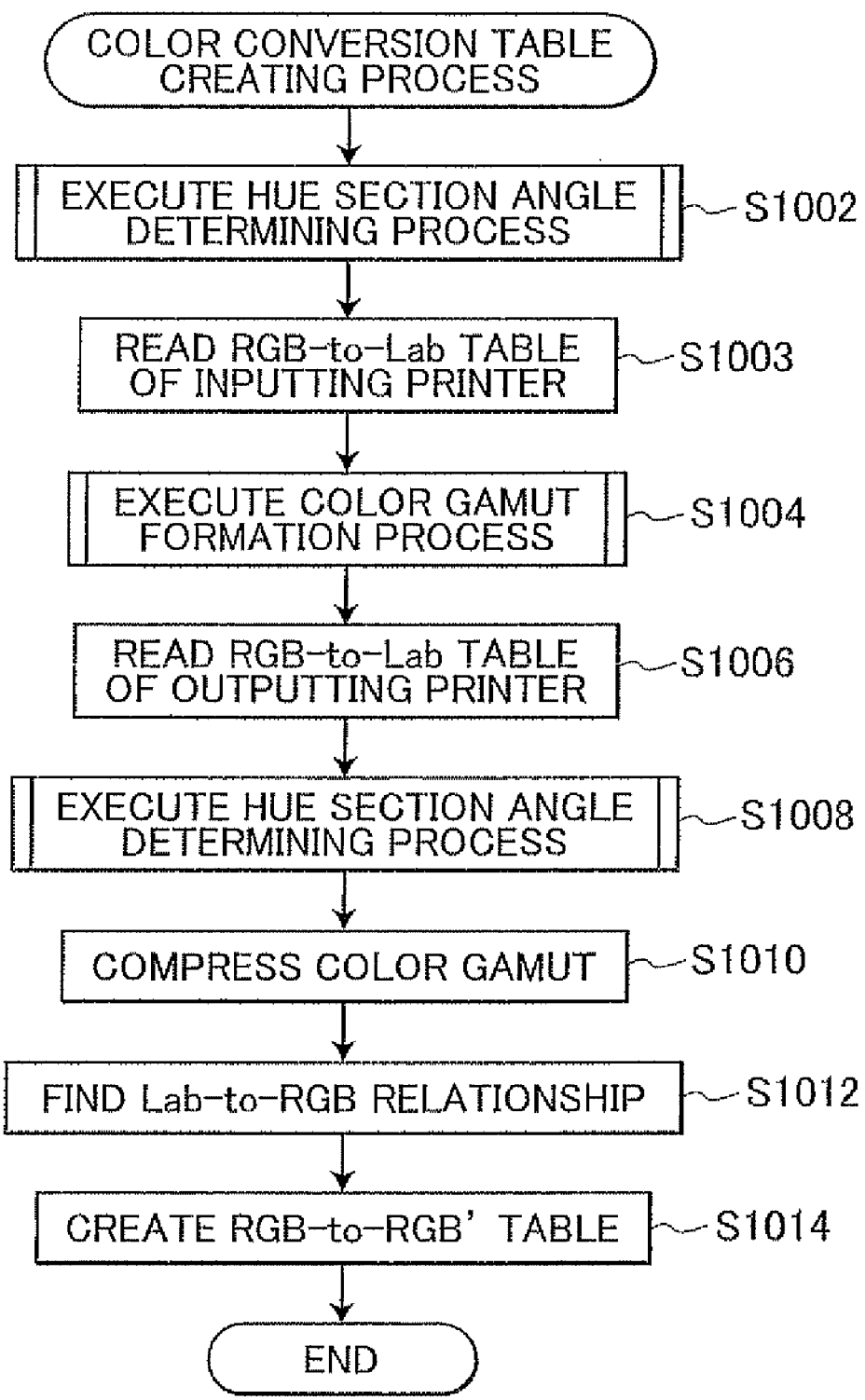
FIG. 19 shows a flowchart of a color conversion table creating process according to the second embodiment.

FIG. 19 shows a flowchart of a color conversion table creating process according to the second embodiment. In S1002 at the beginning of the color conversion table creating process, the CPU 11 executes a hue section angle determining process described later with reference to FIG. 20.

In S1003 the CPU 11 reads the RGB-to-Lab table 321 from the inputting printer 30 (see FIG. 8(*b*)). In S1004 the CPU 11 executes a color gamut formation process for creating color gamut data for the inputting printer 30 based on the measured values (L*a*b* values) stored in the RGB-to-Lab table 321 and stores the color gamut data in the input-end color gamut data memory area 132.

In S1006 the CPU 11 reads the RGB-to-Lab table 521 from the outputting printer 50. In S1008 the CPU 11 executes the color gamut formation process to create color gamut data for the outputting printer 50 based on the measured values stored in the RGB-to-Lab table 521 and to store this color gamut data in the output-end color gamut data memory area 133. The color gamut formation process of S1004 and S1008 will be described below with reference to FIG. 22.

In S1010 the CPU 11 compresses the color gamut for the inputting printer 30. In this process, the CPU 11 compresses the color gamut for the inputting printer 30 in accordance with the color gamut of the outputting printer 50. More specifically, the CPU 11 converts the L*a*b* values in the RGB-to-Lab table 321 read in S1003 so that all L*a*b* values in the RGB-to-Lab table 321 are included in the color gamut 62 of the outputting printer 50.

In S1012 the CPU 11 finds the Lab-to-RGB relationship for the outputting printer 50. This step S1012 is the same as S12 in the first embodiment.

In S1014 the CPU 11 creates the RGB-to-RGB' table 141 (see FIG. 8(*a*)) using the RGB-to-Lab table 321 of the inputting printer 30 obtained by the gamut compression in S1010, and the Lab-to-RGB relationship for the outputting printer 50 found in S1012. As described above, by performing gamut compression on the RGB-to-Lab table 321 for the inputting printer 30, all L*a*b* values fall within the color gamut 62 of the outputting printer 50. Thus, the CPU 11 can create the RGB-to-RGB' table 141 by combining the L*a*b* values in the RGB-to-Lab table 321 with L*a*b* values in the Lab-to-RGB relationship for the outputting printer 50 found in S1012.

The CPU 11 stores the RGB-to-RGB' table 141 created in the color conversion table creating process on the HDD 14. The RGB-to-RGB' table 141 enables the color data processor 1010 to match colors in images formed on the inputting printer 30 and images formed on the outputting printer 50.

Figure 20:
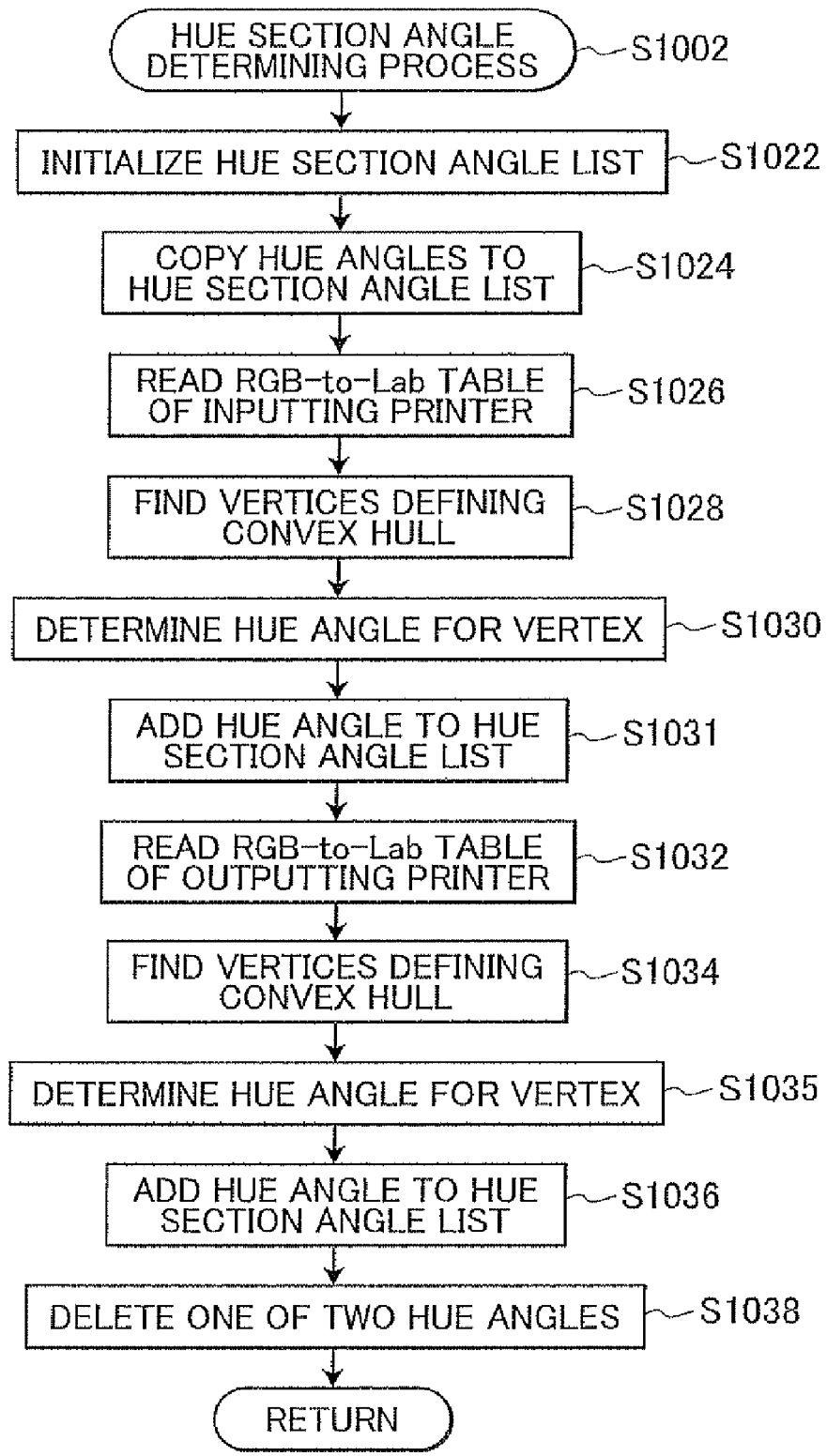
FIG. 20 is a flowchart illustrating steps in a hue section angle determining process in the process of FIG. 19.

FIG. 20 is a flowchart illustrating steps in the hue section angle determining process of S1002. The hue section angle determining process is performed to determine hue angles of the hue cross sections 61 to be used commonly when creating color gamut data for the inputting printer 30 (S1004) and color gamut data for the outputting printer 50 (S1008).

In S1022 the CPU 11 initializes the hue section angle list 130. In S1024 the CPU 11 copies the hue angles recorded in the hue angle list 1121 to the hue section angle list 130. In other words, the CPU 11 acquires a list of a plurality of hue angles at the predetermined prescribed interval (every 9°, for example).

In S1026 the CPU 11 reads the RGB-to-Lab table 321 for the inputting printer 30. In S1028 the CPU 11 projects all the measurement points positioned in the color space 60 based on the measured values (L*a*b* values) stored in the RGB-to-Lab table 321 onto the a*b* plane and finds vertices defining a convex hull indicating the distributed range of the projected measurement points. The vertices of the convex hull can be found using an algorithm well known in the art, such as the gift wrapping algorithm.

In S1030 the CPU 11 determines a hue angle for each of the vertices for the convex hull. In S1031 the CPU 11 adds these hue angles to the hue section angle list 130. That is, the CPU 11 adds hue angles for the vertices of the convex hull to the existing hue angles recorded in the hue angle list 1121.

Figure 21:
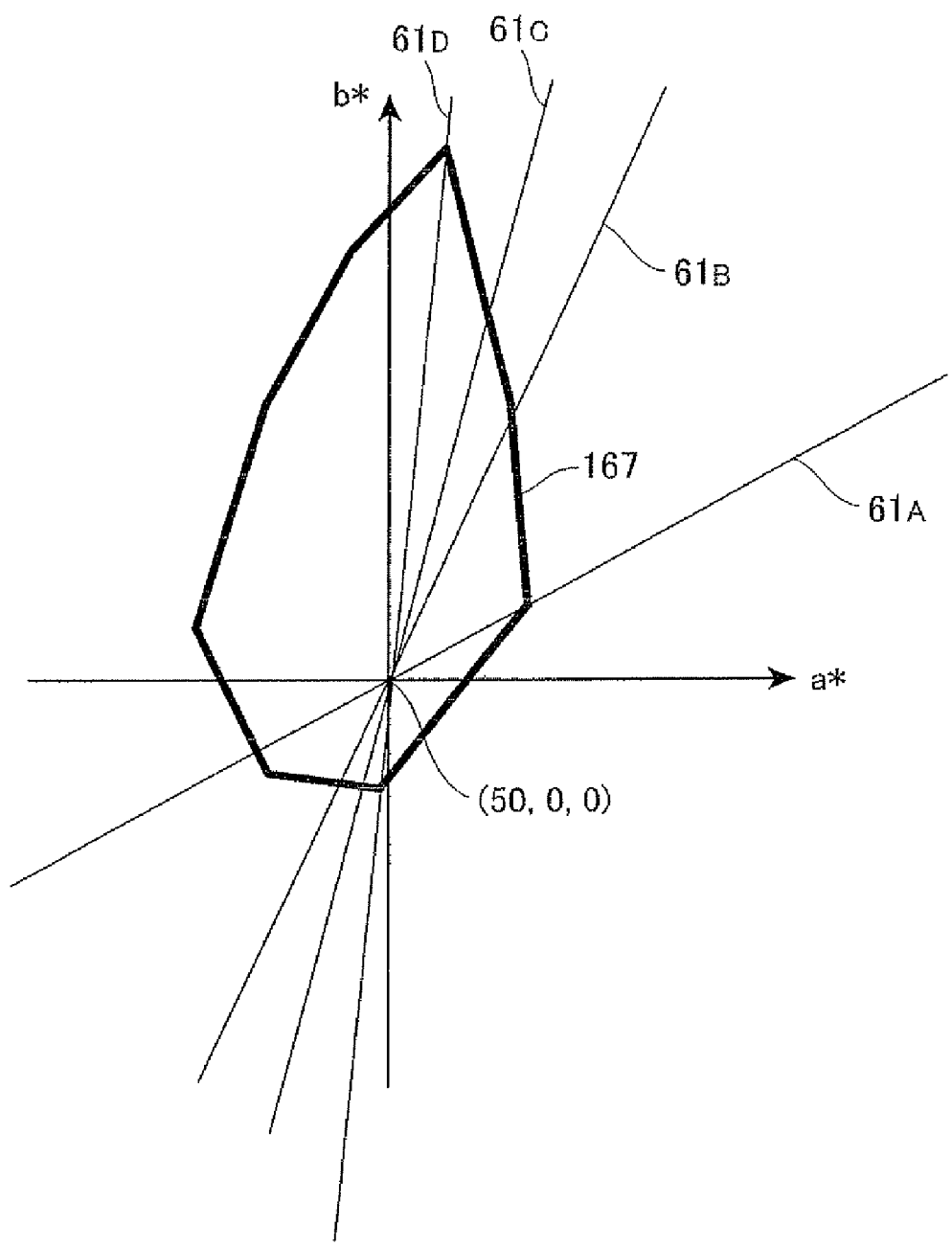
FIG. 21 shows an example a*b* plane in the color space.

Here, the process from S1026 to S1031 will be described is greater detail while referring to FIG. 21. FIG. 21 shows an example a*b* plane (a plane perpendicular to the L* and passing through a point L*=50, for example) in the color space 60. Here, a distance from a point of origin ((L*, a*, b*)=(50, 0, 0)) in the a*b* plane represents saturation, and an angle θ (hue angle) counterclockwise from the positive a* axis, which is set to 0°, represents hue.

When all measurement points in the color space 60 are projected onto this a*b* plane and a convex hull 167 encompassing the measurement points is formed, the distance from the center of the a*b* plane, that is indicated by (L*, a*, b*)=(50, 0, 0), to the surface of the convex hull 167 represents the maximum saturation for each hue. Thus, vertices of the convex hull 167 have a particularly large difference in saturation from neighboring measurement points around the vertices.

Accordingly, as shown in FIG. 21, hue cross sections $61_A$, $61_B$, $61_C$, and $61_D$ pass through vertices of the convex hull 167. The data processor 1010 projects vertices of the convex hull 167 onto hue cross sections, such as the hue cross sections $61_A$, $61_B$, $61_C$, and $61_D$ passing through these vertices. That is, the data processor 1010 does not project these vertices onto hue cross section other than the hue sections passing these vertices. Hence, the data processor 10101 can find the hull points 64 correctly.

Returning to FIG. 20, in S1032 the CPU 11 reads the RGB-to-Lab table 521 for the outputting printer 50, similar to S1026. In S1034 the CPU 11 projects measured values (L*a*b* values) stored in the RGB-to-Lab table 521 on the a*b* plane and finds vertices of the convex hull 167 that encompasses the projected measurement points. In S1035 the CPU 11 determines the hue angle for each vertex of the convex hull 167, and in S1036 adds these hue angles to the hue section angle list 130. The processes of S1034-S1036 are similar to the processes of S1028-S1031.

In S1038 the CPU 11 examines the difference between every two neighboring hue angles from the hue angles recorded in the hue section angle list 130 and deletes one of the two hue angles from the list when the difference between the two hue angles is no greater than a prescribed value (4°, for example). In other words, when the difference between the two neighboring hue angles are lower than the prescribed value, the CPU 11 deletes one of the neighboring hue angles from the hue section angle list 130. Subsequently, the CPU 11 ends the hue section angle determining process. It is noted that when deleting hue angles in S1038, hue angles at vertices of the convex hull are given priority to remain.

In the color gamut formation process of S1004 and S1008 described later, the color data processor 1010 creates color gamut data for the inputting printer 30 and the outputting printer 50 for the hue cross section 61 of each hue angle set in the hue section angle determining process of S1002.

In the hue section angle determining process (S1002) described above, the color data processor 1010 determines hue angles through vertices of a convex hull) indicating the distributed range of measurement points projected on the a*b* plane. Subsequently, the data processor 1010 sets hue angles for the hue cross sections 61 based on hue angles determined for the vertices of the convex hull. Accordingly, the color data processor 1010 can set hue angles for hue sections reflecting the distribution of measurement points, and can create color gamut data accurately representing the color gamut of a device, without recklessly increasing the number of hue cross sections 61.

Further, when the difference between a pair of neighboring hue angles is no greater than the prescribed value, one of the two hue angles is deleted from the hue section angle list 130. Accordingly, the embodiment prevents hue angles to be processed from being excessively close to each other, thereby reducing processing time and conserving the amount of memory used.

Further, since the hue angles of the hue cross sections 61 are determined based on the hue angles set for both the inputting printer 30 and the hue angles set for the outputting printer 50, color gamut data for both the inputting printer 30 and outputting printer 50 can be accurately created. Since color gamut data for the inputting printer 30 and for the outputting printer 50 are both created using the common hue angles, the color data processor 1010 can perform an appropriate gamut compression process between the inputting printer 30 and outputting printer 50. The gamut compression is performed when the inputting printer 30 has a broader gamut than the outputting printer 50. The gamut compression makes maximum use of the output gamut with the input and output gamuts being precise.

Next, the color gamut formation process of S1004 and S1008 executed by the color data processor 1010 will be described with reference to FIG. 22. FIG. 22 is a flowchart illustrating steps in this process. The color gamut formation process of S1004 is executed after the CPU 11 reads the RGB-to-Lab table 321 from the inputting printer 30. The color gamut formation process of S1004 is performed to create color gamut data for the inputting printer 30. The color gamut formation process of S1008 is executed after the CPU 11 reads the RGB-to-Lab table 521 from the outputting printer 50. The color gamut formation process of S1008 is performed to create color gamut data for the outputting printer 50.

In S1042 of the color gamut formation process, the CPU 11 converts, to L*C*h* values, all the measured values (L*a*b* values) included in the RGB-to-Lab table 321 (when the color gamut formation process is executed in S1004) or the RGB-to-Lab table 521 (when the color gamut formation process is executed in S1008) read in the previous step. Here, C* represents hue, and h* represents hue angle.

In S1044 the CPU 11 reads a single hue angle φ from the plurality of hue angles recorded in the hue section angle list 130. In S1046 the CPU 11 extracts L*C*h* values for which h*, representing hue angle, falls within a range from φ−4.5° to φ+4.5° and converts the extracted L*C*h* values back to L*a*b* values.

Figure 23A:
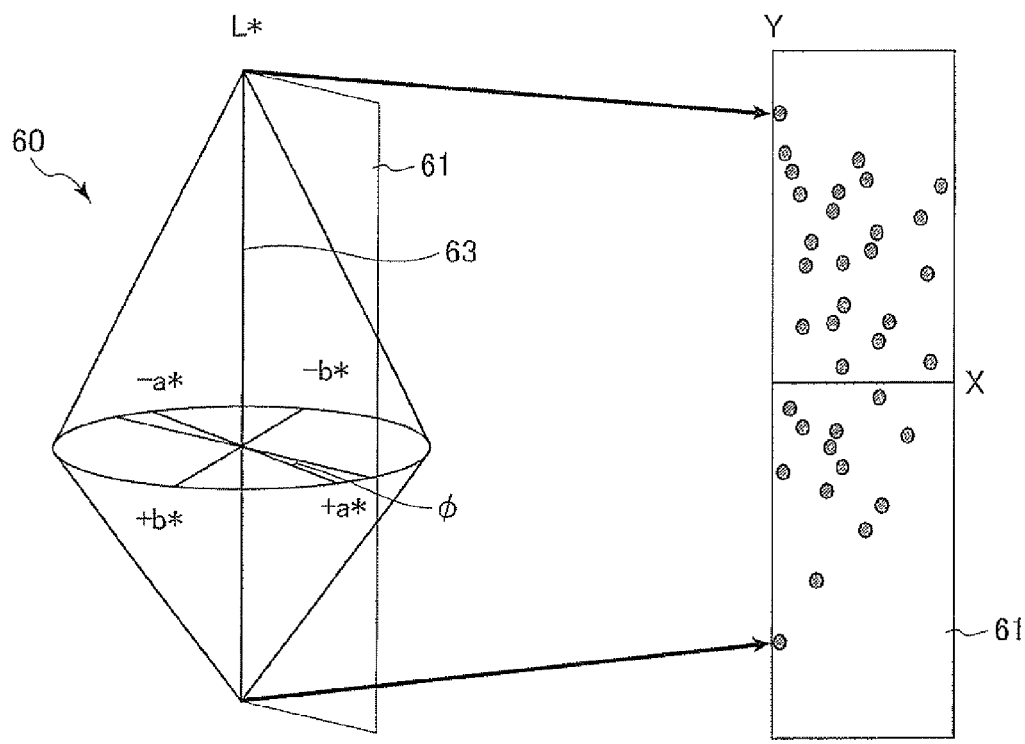
FIG. 23(a) is an explanatory diagram illustrating how to project measurement points on a hue cross section in a L*a*b* color space three-dimensionally.

In S1048 the CPU 11 converts the extracted L*a*b* values to two-dimensional coordinate data expressed in a Cartesian coordinate system (XY-coordinate system) as shown in FIG. 23(a). This coordinate data indicates the positions of measurement points in the hue cross section 61 when measurement points plotted in the L*a*b* color space 60 according to the L*a*b* values extracted in S1046 are projected onto the hue cross section 61 at the hue angle φ.

Figure 7B:
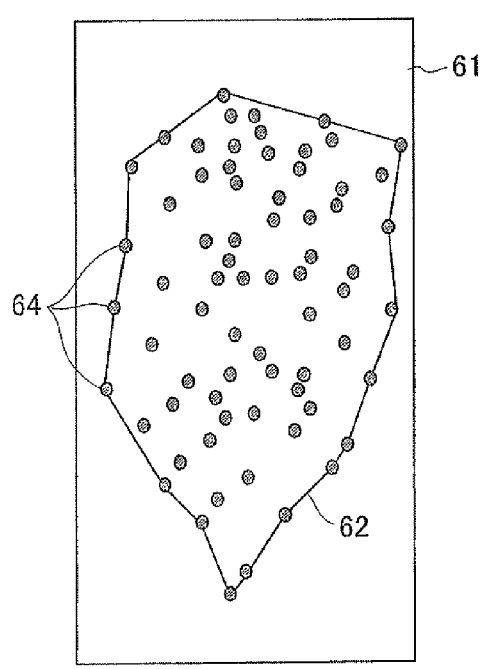
FIG. 7(b) shows how to determine hull points in the hue cross section.
Figure 7C:
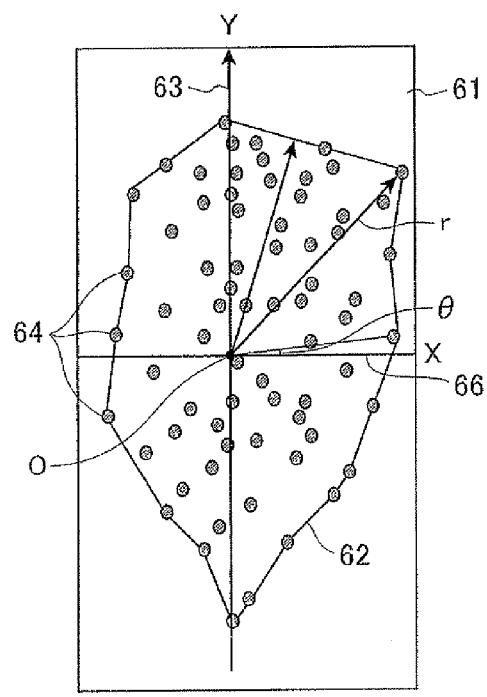
FIG. 7(c) illustrates a polar coordinate system representing a surface (hull) of a color gamut.
Figure 23B:
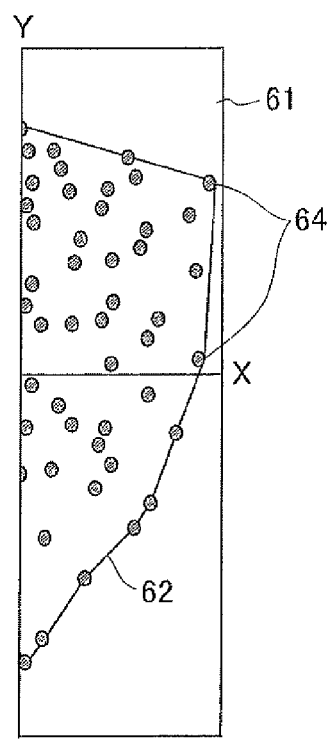
FIG. 23(b) shows how to determine hull points in the hue cross section.
Figure 23C:
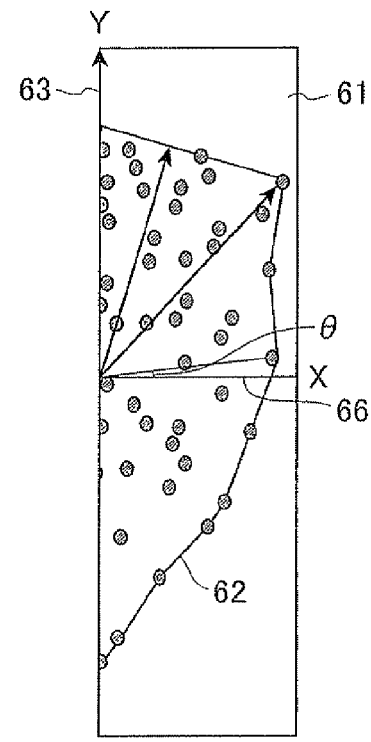
FIG. 23(c) Illustrates a polar coordinate system representing a surface (hull) of a color gamut.

FIGS. 23(a)-23(c) is an explanatory diagram illustrating the L*a*b* color space 60 three-dimensionally and the cross section 61 similar to FIGS. 7(a)-7(c). In the first embodiment, as shown in FIG. 7(a), when the angle φ is stored in the hue angle list 121, both of the measurement points having hue angles from φ−4.5° to φ+4.5° and the measurement points having hue angles from (φ+180°)−4.5° to (φ+180°)+4.5° are extracted and projected onto the hue cross section 61 at the angle φ. In the second embodiment, when the angle φ is stored in the hue angle list 130, only the measurement points having hue angles from φ−4.5° to φ+4.5° are extracted and projected onto the hue cross section 61 at the angle φ. When the angle φ+180° is stored in the hue angle list 130, the measurement points having hue angles from (φ+180°)−4.5° to (φ+180°)+4.5° are projected onto the hue cross section 61 at the angle φ+180°. In other words, in the second embodiment, the data processor 1010 treats separately the measurement points having hue angles from φ−4.5° to φ+4.5° and the measurement points having hue angles from (φ+180°)−4.5° to (φ+180°)+4.5°.

In S1050 the CPU 11 extracts hull points. As described with reference to FIG. 23(b), the hull points 64 define the color gamut 62. The hull points 64 are extracted using an algorithm well known in the art, such as the gift wrapping algorithm.

In S1052, as shown in FIG. 23(c) the CPU 11 creates color gamut data configured of polar coordinate data representing the surface of the color gamut 62 using coordinate data for the hull points extracted in S1050, and stores this color gamut data in the input-end color gamut data memory area 132 (when the color gamut formation process is executed in S1004) or the output-end color gamut data memory area 133 (when the color gamut formation process is executed in S1008). In S1054 the CPU 11 determines whether the above process has been performed for all hue angles φ recorded in the hue angle list 1121. The CPU 11 repeats the above process from S1044 if unprocessed hue angles φ remain (S1054: NO).

If the CPU 11 determines in S1054 after repeatedly performing the above process that the process has been performed for all hue angles φ recorded in the hue section angle list 130 (S1054: YES), the CPU 11 ends the color gamut formation process.

Through the color gamut formation process described above, the CPU 11 can create color gamut data for the inputting printer 30 and the outputting printer 50 based on the RGB-to-Lab tables 321 and 521 read just prior to the process.

First Modification of Second Embodiment

In the hue section angle determining process of S1002 described above, the color data processor 1010 projects each measured value on the a*b* plane and finds vertices forming a convex hull 167 that encompasses the projected measurement points, adding hue angles for these vertices in the hue section angle list 130 (S1034 and S1036). However, rather than finding vertices for a convex hull, the color data processor 1010 may be configured to find vertices for a concave polygon or other polygon encompassing the projected measurement points, adding hue angles for these vertices to the hue section angle list 130. In other words, the color data processor 1010 adds hue angles at vertices that form convex portions of the polygon that encompasses the projected measurement points as well as hue angles at vertices that form reentrant portions of the polygon that encompasses the projected measurement points.

Figure 24:
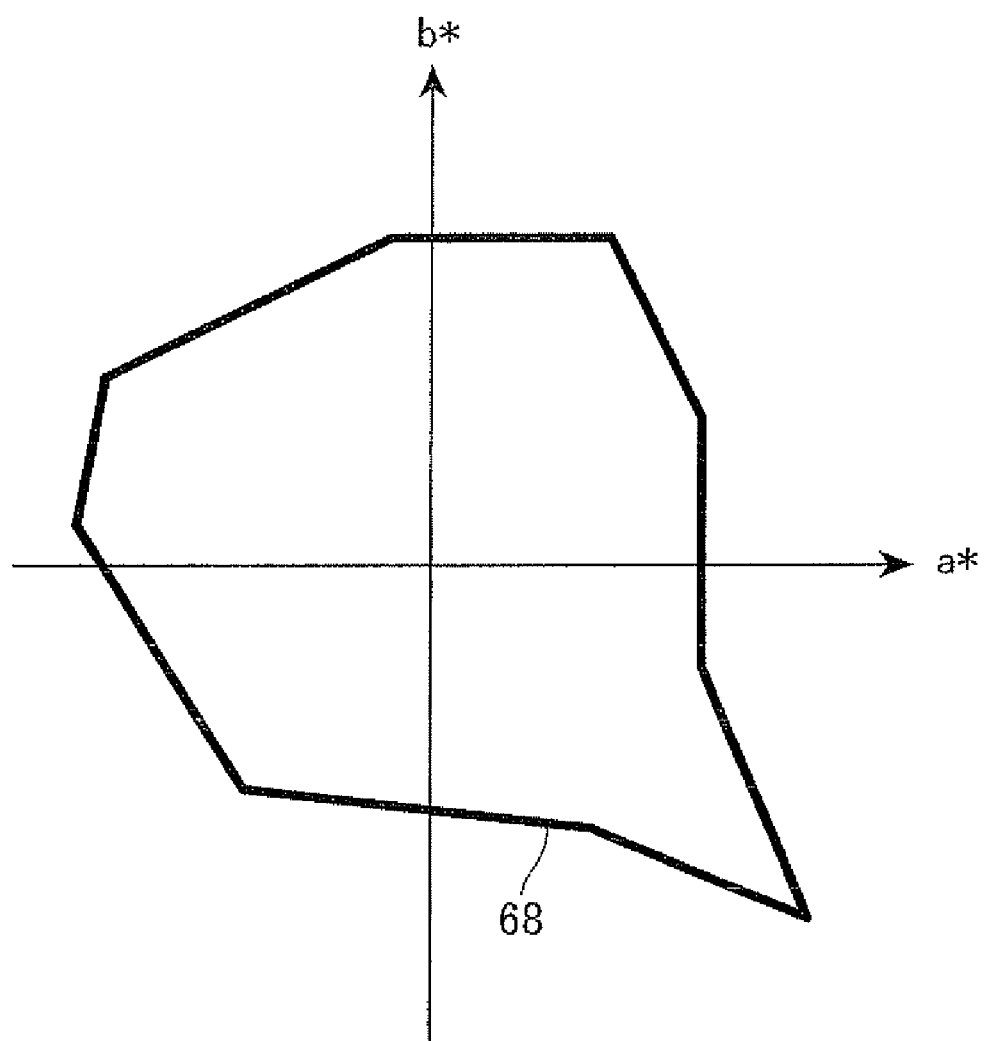
FIG. 24 shows an example of a concave polygon that is created encompasses measurement points projected onto the a*b* plane in the color space according to a first modification of the second embodiment.

FIG. 24 shows an example of a concave polygon 68 that encompasses measurement points projected onto the a*b* plane in the color space 60. Here, the concave polygon 68 is a polygon that does not meet the condition of all interior angles being less than 180°. By forming a hue cross section 61 at a hue angle passing through each vertex of the concave polygon 68, the color data processor 1010 can create more precise color gamut data.

Figure 25:
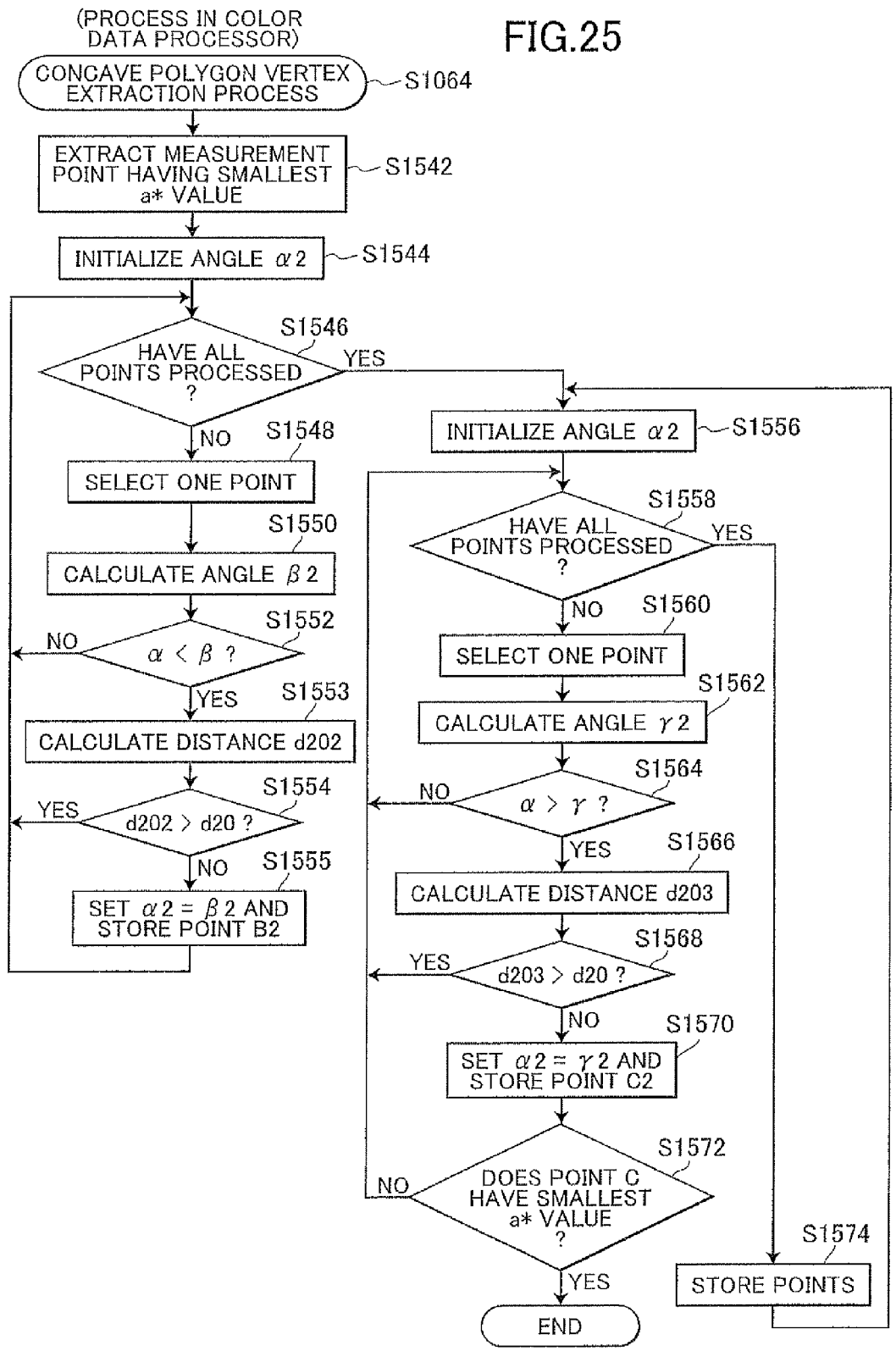
FIG. 25 is a flowchart illustrating steps in a concave polygon vertex extraction process for extracting vertices of the concave polygon according to the first modification of the second embodiment.

FIG. 25 is a flowchart illustrating steps in a concave polygon vertex extraction process for extracting vertices of the concave polygon 68. By executing this concave polygon vertex extraction process of S1064 in place of the process for finding vertices of a convex hull in S1028 or S1034 of the hue section angle determining process (see FIG. 20), the color data processor 1010 can determine hue cross sections 61 based on vertices of the concave polygon shown in FIG. 24.

In S1542 at the beginning of the concave polygon vertex extraction process, the CPU 11 extracts a measurement point projected on the a*b* plane having the smallest a* value and stores this measurement point in the RAM 13 as a point A2. In S1544 the CPU 11 initializes an angle α2 to 0.

In S1546 the CPU 11 determines whether all measurement points other than the point A2 have been processed. Since the CPU 11 initially reaches a negative determination (S1546: NO), in S1548 the CPU 11 selects one measurement point other than the point A2 and reads coordinate data for this point. In S1550 the CPU 11 calculates an angle β2 indicating the positional relationship between the selected measurement point and the point A2, based on the point A2 and the coordinate data read in S1548.

Figure 26A:
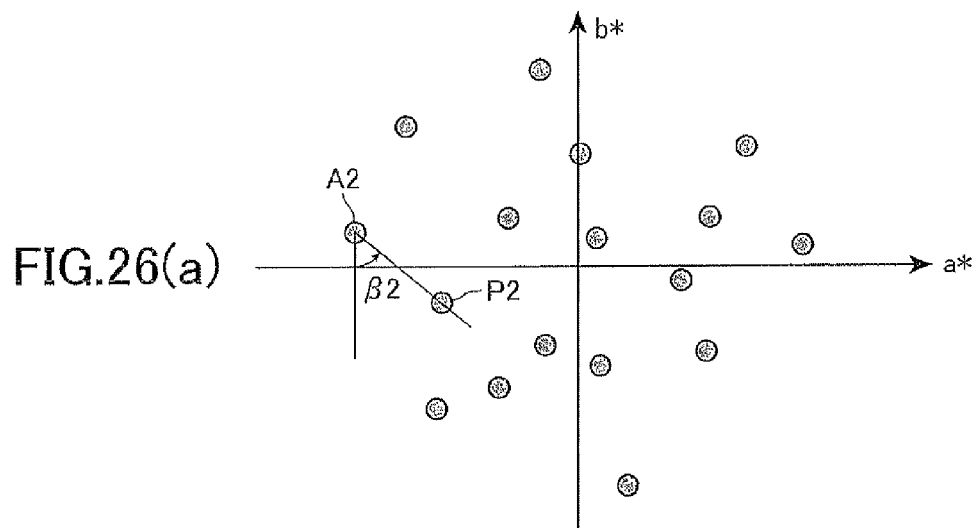
FIG. 26(a) is a graph illustrating an angle β2.

FIG. 26(a) is a graph illustrating this angle β2. As z shown in FIG. 26(a), in the concave polygon vertex extraction process, the CPU 11 defines the angle β2 as the angle formed by a line connecting the selected point (a point P2 in FIG. 26(a)) and the point A2 and a line extending from the point A2 along the negative direction of the b*-axis, a counterclockwise angle with the line extending in the negative direction of the b*-axis set to 0°.

Returning to FIG. 25, in S1552 the CPU 11 determines whether the angle β2 calculated in S1550 is greater than the angle α2. Since the angle α2 is initialized to 0° in the beginning, the CPU 11 determines that β2 is greater than α2 (S1552: YES). In S1553 the CPU 11 calculates a distance d202 from the point A2 to the selected measurement point. In S1554 the CPU 11 determines whether the distance d202 calculated above is greater than a reference distance d20. Here, the reference distance d20 is determined in advance. For example, the reference distance d20 is determined in advance such that the distance d20 becomes smaller than the distance between vertices of the convex hull 167 described with reference to FIG. 21. Alternatively, the distance d20 is determined by the same processes S50-S52 (FIG. 10) which are expected to determine the reference distance d. If the calculated distance d202 is greater than the reference distance d20 (S1554: YES), indicating that the extracted point is too apart from the point A2, the CPU 11 determines that this point should not be a vertex of the concave polygon and returns to S1546.

However, if the calculated distance d202 is less than the reference distance d20 (S1554: NO), indicating that the extracted (selected) point selected in S1548 is sufficiently near the point A2 and, that this extracted (selected) point has a possibility to be a vertex of the concave polygon adjacent to the point A2, in S1555 the CPU 11 sets α2 to the value of β2 (α2=β2) and stores the measurement point extracted in S1548 in the RAM 13 as a point B2. Subsequently, the CPU 11 returns to S1546. In S1548 the CPU 11 selects a next measurement point, reads coordinate data for this point, and repeats the process described above. By repeatedly performing this process, the CPU 11 can determine a measurement point having the maximum angle β2 as a point E2 from among all the projected points that are within distance d20 from the point A20 on the a*b* plane.

Figure 26B:
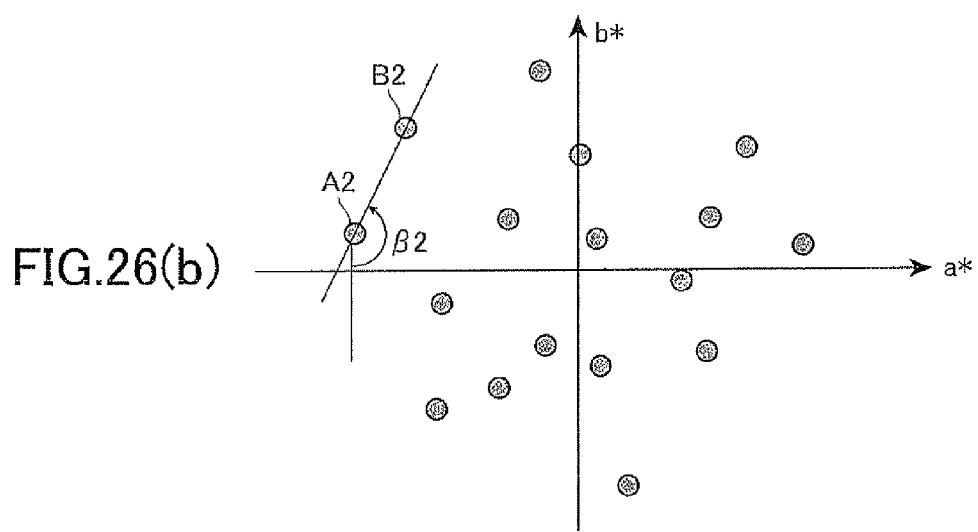
FIG. 26(b) shows a positional relationship of points A2 and B2.

FIG. 26(b) shows the positional relationship of the points A20 and B2. As shown in FIG. 26(b), a point B2 can be extracted as a vertex of the concave polygon adjacent to the point A2 by setting the point B2 to the measurement point having the largest angle β2 from among all the projected points that are located on the a*b* plane within the distance d20 from the point A2. Here, the specific method of performing calculations to extract the point B2 is not limited to the method described above in S1546-S1555, provided that a measurement point can be found such that all the points within the distance d20 from the point A2 other than the points A2 and B2 are positioned on one side of a line passing through the points A2 and B2.

Returning to FIG. 25, when this process for determining the point B2 has been performed for all measurement points other than the point A2 (S1546: YES), in S1556 the CPU 11 initializes the angle α to 360°. In S1558 the CPU 11 determines whether all measurement points other than the points A2 and B2 have been processed in S1558-S1572. Since the CPU 11 reaches a negative determination initially (S1558: NO), in S1560 the CPU 11 selects one measurement point P2 other than the points A2 and B2 and reads coordinate data for this measurement point. In S1562 the CPU 11 calculates an angle γ2 formed by the line connecting the selected measurement point P2 and the point B2 and a line connecting the points A2 and B2.

Figure 26C:
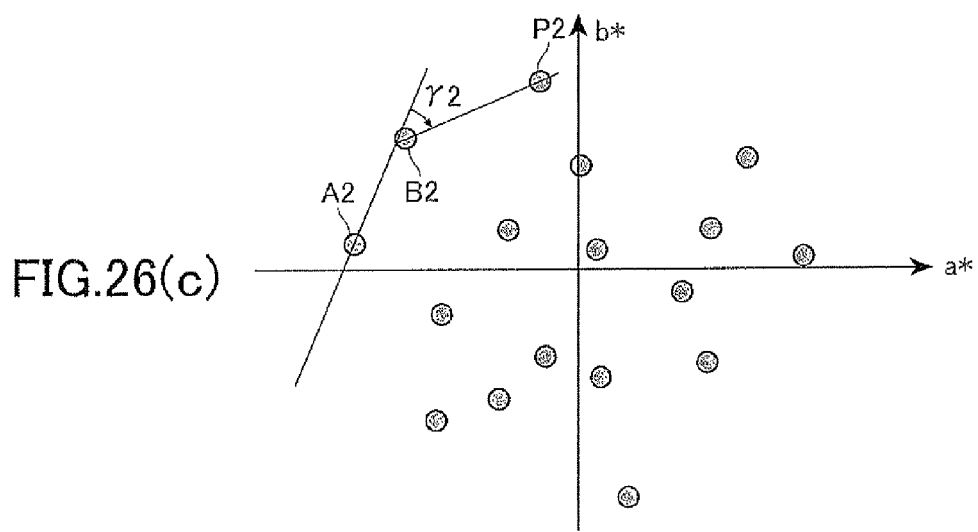
FIG. 26(c) shows a positional relationship between the points A2 and B2 and a newly selected measurement point P2.

FIG. 26(c) shows the positional relationship between the points A2 and 82 and the newly selected measurement point (point P2 in FIG. 26(c)). As shown in FIG. 26(c), the angle γ2 is a clockwise angle (rightward) from the line connecting the points A2 and B2 to the line connecting the selected measurement point P2 and the point B2.

Returning to FIG. 25, in S1564 the CPU 11 determines whether the calculated angle γ2 is smaller than the angle α2. Since the angle α2 is set initially to 360°, the CPU 11 determines that γ2 is smaller than α2 (S1564: YES).

In S1566 the CPU 11 calculates a distance d203 from the paint B2 to the measurement point P2 selected in S1560. In S1568 the CPU 11 determines whether the calculated distance d203 is greater than the reference distance d20. If the distance d203 is greater than the reference distance d20 (S1568: YES), indicating that the selected point P2 is too far from the point B2, then the CPU 11 determines that the selected point P2 should not be a vertex of the concave polygon adjacent to the point B2 and returns to S1558.

However, if the calculated distance d203 is within the reference distance d20 (S1568, NO), indicating that the extracted (selected) point P2 is sufficiently near the point B2 and, that the selected point P2 has a possibility to be a vertex of the concave polygon adjacent to the point B2, in S1570 the CPU 11 sets α2 to the value of γ2 (α2=γ2) and stores the measurement point extracted in S1560 in the RAM 13 as a point C2. In S1572 the CPU 11 determines whether the point C2 has a minimum a* value among all the measurement points on the a*b* plane. Since the CPU 11 reaches a negative determination when not all vertices of the concave polygon have been extracted (S1572: NO), the CPU 11 returns to S1558 and repeats the process described above. By repeating the process of S1558-S1572 described above, the CPU 11 can set a point C2 to the measurement point having the smallest angle γ2 among the projected points other than the points A2 and B2 on the a*b* plane and separated from the point B2 by a distance no greater than the reference distance d20.

After performing the above process on all measurement points (S1558: YES), in S1574 the CPU 11 sets the point B2 (the coordinate value of the current point B2) as a new point A2, sets the point C2 (the coordinate value of the current point C) as a new point B2. Further, in S1574 the CPU 11 stores coordinate data for these points in the RAM 13. The vertices extracted as points A2, B2, and C2 are stored in the RAM 13 in association with the order in which they have been extracted.

Next, the CPU 11 returns to S1556 and repeats the process described above, i.e., a process for extracting the next point C2 by using the previously extracted point C2 as a new point B2.

When the CPU 11 determines that the point C2 has a minimum a* value among all the measurement points on the a*b* plane after repeatedly performing the above process (S1572: YES), then the CPU 11 ends the concave polygon vertex extraction process and returns to the color gamut formation process.

In the concave polygon vertex extraction process, the color data processor 1010 can extract vertices of the concave polygon described with reference to FIG. 24. Hence, the color data processor 1010 can set the hue cross sections 61 based on the hue angles passing through the vertices of the concave polygon.

Second Modification of Second Embodiment

While the color data processor 1010 projects all measurement points in the color space 60 onto a single plane (the a*b* plane having L* of 50) in the hue section angle determining process of S1002 described above, the color data processor 1010 may instead be configured to project measurement points onto a plane for each lightness. For example, the color data processor 1010 may divide the color space 60 into a plurality of lightness regions by a plurality of planes orthogonal to the achromatic axis 63. The color data processor 1010 projects all the measurement points plotted in one of a plurality of lightness regions onto the a*b* plane. The data processor 1010 determines vertices of a polygon generated based on the distributed range of measurement points projected on the a*b* plane. By repeatedly performing the above procedures, the data processor 1010 determines vertices of polygons for all the plurality of lightness regions. In other words, the color data processor 1010 determines vertices of a polygon for each lightness region and adds hue angles passing through vertices of each polygon to the hue section angle list 130. In this case the hue section angle list 130 has hue angles for all the lightness regions.

Accordingly, even when measurement points are irregularly distributed fox each lightness, the color data processor 1010 can determine hue angles for hue cross sections 61 reflecting this irregular distribution and can create color gamut data accurately representing the color gamut of the device.

Third Modification of Second Embodiment

If it is desirable to create more precise color gamut data for a certain color (blue, for example), the color data processor 1010 may determine hue angles at hue cross sections 61 set more densely for this color.

Fourth Modification of Second Embodiment

Hue angles corresponding to 20 or 40 evenly spaced hues in the Munsell color system may be pre-stored in the hue angle list 1121. In 1024 the CPU 11 copies this hue angle list 1121 to the hue section angle list 130. In S1024 and S1036 the CPU 11 adds the hue angles to the hue section angle list 130. In this case, the color data processor 1010 can create hue data for hue angles at intervals corresponding to color differences that are perceivable by the human eye.

Fifth Modification of Second Embodiment

In S1050 the hull points are extracted by the gift wrapping algorithm. However, the hull points may be extracted by the hull point extraction process S54 (see FIG. 12) of the first embodiment. In this case, the hull points are extracted to represent any concave curvature in the color gamut. Hence, the color data processor 1010 can create color gamut data capable of reproducing a color gamut more faithfully based on the extracted hull points. Further, the hull points may be extracted by the hull point extraction process S54 according to the third modification of the first embodiment (see FIG. 17). In this case, the starting point (the point A used in S542) is set as one of a maximum value and a minimum value of the measurement points that are located on the achromatic axis, and the end point (the point C used in S172) is set as the other one of the maximum value and the minimum value.

While the invention has been described in detail with reference to the above embodiments thereof, it would be apparent to those skilled in the art that various changes and modifications may be made therein without departing from the spirit of the invention.

For example, while the color data processor 1010 performs color matching for printers in the embodiments described above, the invention is not limited to printers. For example, the color data processor 1010 may perform color matching for other devices, such as monitors, scanners, and cameras.

Further, the color data processor 1010 executes the color conversion table creating process shown in FIG. 9 in the embodiment described above, but a process equivalent to this color conversion table creating process may be implemented on the device side, such as the inputting printer 30 or the outputting printer 50.

What is claimed is:

1. A color gamut data creating device comprising:
   a receiving unit that receives measurement points of a device, the measurement points being defined in a color space;
   an extracting unit that extracts at least four vertices from among the measurement points, the at least four vertices including first, second, and third vertices that are located adjacent to one another, the first, second, and third vertices satisfying the criteria of a distance between each two vertices among the first, second, and third vertices being smaller than a reference distance, and inner products having the same sign, each inner product being calculated between a vector defined from the first vertex to each of the respective measurement points located within the reference distance from the first vertex, and a vector normal to a plane defined by the first, second, and third vertices; and
   a data creating unit that creates color gamut data indicative of a color gamut, the color gamut indicating a distribution range of the measurement points based on the at least four vertices extracted by the extracting unit.

2. The color gamut data creating device unit as claimed in claim 1, wherein a position of the vertices or the measurement points in the color space is expressed by a Cartesian coordinate system defining an x-axis, a y-axis perpendicular to the x-axis, and z-axis perpendicular to both the x-axis and y-axis, the position having an x coordinate along the x-axis and a y coordinate along the y-axis, a z-coordinate along the z-axis,
   the data creating unit further comprising a reference distance determining unit that determines the reference distance to be smaller than a prescribed distance between two measurement points that are selected from among an xmax point that has a maximum value with respect to the x coordinate, an xmin point that has a minimum value with respect to the x coordinate, a ymax point that has a maximum value with respect to the y coordinate, a ymin point that has a minimum value with respect to the y coordinate, a zmax point that has a maximum value with respect to the z coordinate, and a zmin point that has a minimum value with respect to the z coordinate.

3. The color gamut data creating device unit as claimed in claim 2, wherein the prescribed distance is a largest distance among a plurality of distances that are defined between all of a plurality of combinations of two points selected from among the xmin, xmax, ymin, ymax, zmin, and zmax points.

* * * * *